United States Patent
Simmons et al.

(10) Patent No.: US 9,933,846 B2
(45) Date of Patent: Apr. 3, 2018

(54) ELECTRONIC SYSTEM WITH DISPLAY MODE MECHANISM AND METHOD OF OPERATION THEREOF

(71) Applicant: Samsung Electronics Co., Ltd., Suwon-si, Gyeonggi-Do (KR)

(72) Inventors: Daniel William Simmons, San Francisco, CA (US); Nina F. Shih, Mountain View, CA (US); Robin M. Tafel, San Francisco, CA (US); Eugene W. Becker, Menlo Park, CA (US); Natasha Tan, San Francisco, CA (US); Christoph Dressel, Lisbon (PT); Kwame Ferreira, London (GB); Guy Bar-Nahum, San Francisco, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/165,307

(22) Filed: Jan. 27, 2014

(65) Prior Publication Data
US 2014/0210708 A1 Jul. 31, 2014

Related U.S. Application Data

(60) Provisional application No. 61/757,667, filed on Jan. 28, 2013, provisional application No. 61/757,670, filed on Jan. 28, 2013, provisional application No. 61/758,730, filed on Jan. 30, 2013.

(51) Int. Cl.
*G06F 3/01* (2006.01)
*G06F 1/16* (2006.01)
*G09G 5/00* (2006.01)
*G09G 5/14* (2006.01)

(52) U.S. Cl.
CPC .............. *G06F 3/01* (2013.01); *G06F 1/1626* (2013.01); *G06F 1/1694* (2013.01); *G06F 3/017* (2013.01); *G09G 5/00* (2013.01); *G09G 5/14* (2013.01); *G06F 2200/1614* (2013.01); *G09G 2340/045* (2013.01); *G09G 2340/0442* (2013.01); *G09G 2340/0492* (2013.01); *G09G 2340/14* (2013.01); *G09G 2340/145* (2013.01)

(58) Field of Classification Search
CPC ... G06F 3/01; G09G 5/00; G09G 5/14; G09G 5/32; G09G 2340/0442; G09G 2340/045; G09G 2340/0492; G09G 2340/14; G09G 2340/145
See application file for complete search history.

(56) References Cited

U.S. PATENT DOCUMENTS

| | | | |
|---|---|---|---|
| 7,181,251 B2 | 2/2007 | Stohr et al. | |
| 7,369,872 B2 | 5/2008 | Lee et al. | |
| 7,814,419 B2 | 10/2010 | Fabritius | |
| 2005/0143124 A1 | 6/2005 | Kennedy et al. | |

(Continued)

FOREIGN PATENT DOCUMENTS

WO 2012123788 A1 9/2012

*Primary Examiner* — Aneeta Yodichkas
(74) *Attorney, Agent, or Firm* — Perspectives Law Group

(57) ABSTRACT

An electronic system includes: a control unit configured to: detect a motion applied to a device with a display in a mode; select another mode of the display based on the device motion; and a user interface, coupled to the control unit, configured to apply a screen motion to the another mode of the display.

20 Claims, 17 Drawing Sheets

(56) References Cited

U.S. PATENT DOCUMENTS

| | | |
|---|---|---|
| 2005/0243783 A1* | 11/2005 | Lee ................... G06F 1/1616 370/338 |
| 2008/0064439 A1* | 3/2008 | Na ..................... G09G 3/20 455/556.1 |
| 2008/0165144 A1 | 7/2008 | Forstall et al. |
| 2009/0225026 A1* | 9/2009 | Sheba ................... 345/156 |
| 2010/0000760 A1 | 1/2010 | Kirkup |
| 2011/0012926 A1 | 1/2011 | Kerr et al. |
| 2012/0050161 A1 | 3/2012 | Andersson et al. |
| 2012/0105428 A1* | 5/2012 | Fleck .............. G06F 3/1431 345/419 |
| 2013/0021236 A1 | 1/2013 | Bender |
| 2013/0101268 A1* | 4/2013 | Seto ...................... 386/230 |
| 2013/0135350 A1* | 5/2013 | Santos-Gomez ... G06F 3/04886 345/649 |
| 2013/0191783 A1* | 7/2013 | Sugita et al. ............. 715/810 |
| 2014/0000949 A1 | 1/2014 | Bismilla |
| 2014/0009499 A1 | 1/2014 | Gardenfors et al. |

* cited by examiner

ELECTRONIC SYSTEM WITH DISPLAY MODE MECHANISM AND METHOD OF OPERATION THEREOF

CROSS-REFERENCE TO RELATED APPLICATION(S)

This application claims the benefit of U.S. Provisional Patent Application Ser. No. 61/757,667 filed Jan. 28, 2013, U.S. Provisional Patent Application Ser. No. 61/757,670 filed Jan. 28, 2013, and U.S. Provisional Patent Application Ser. No. 61/758,730 filed Jan. 30, 2013, and the subject matter thereof is incorporated herein by reference thereto.

TECHNICAL FIELD

An embodiment of the present invention relates generally to an electronic system, and more particularly to a system for electronic display.

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

Applications for these devices continue to provide greater functionality. In addition to conventional voice capabilities, these devices permit users to connect to a variety of information and media sources such as the Internet as well as watching movies, reading and writing text messages and emails, or making phone calls, at times concurrently. Unfortunately, as the richness and complexity of these applications increase, the complexity of the user interface increases commensurately.

For example, mobile devices have been developed in a variety of configurations, with various display options. It has become an increasingly greater challenge for the user to manage and control the use of these displays, particularly when the mobile devices support numerous applications that optimized for particular display configurations. Compounding this problem is the fact that users can position the displays in a host of orientations. Thus, one display or screen configuration may be optimal in one orientation, but not in another. Traditionally, the orientation of the device has not been fully integrated with the users' display preferences.

In some devices, the orientation can be changed by pressing a hard key of the device. However, due to the limited size of hand-held devices, additional hard keys are generally difficult to place on the device, and assigning an already existing hard key additional functionality, for instance that the hard key has to be pressed for a longer duration to call the additional functionality, may distract the user of the device.

In other devices, the change of the orientation is implemented as a menu option of a display menu. The user of the device then has to browse the devices menu and find the corresponding entry in order to change the orientation, which is a time-consuming and annoying task especially when the orientation is frequently changed. Furthermore, the unskilled user of the device may not be aware of the possibility to change the orientation or may get lost in the menu when searching for it.

In further devices, the change of the orientation uses motion sensors in the device to determine if the device itself is rotated by a user. This approach, however, deprives the user of the freedom to choose the orientation which is preferred to watch an image. Furthermore, this method may become unstable in a mobile environment where the device is subject to frequent relocation and shocks.

Thus, a need still remains for an electronic system with display mode mechanisms. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system, including: a control unit configured to: detect a motion applied to a device with a display in a mode; select another mode of the display based on the device motion; and a user interface, coupled to the control unit, configured to apply a screen motion to the another mode of the display.

An embodiment of the present invention provides a method of operation of an electronic system including: detecting, with a control unit, a motion applied to a device with a display in a mode; selecting another mode of the display based on the device motion; and applying a screen motion to the another mode of the display.

An embodiment of the present invention provides a non-transitory computer readable medium including stored thereon instructions to be executed by a control unit comprising: detecting a motion applied to a device with a display in a mode; selecting another mode of the display based on the device motion; and applying a screen motion to the another mode of the display.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
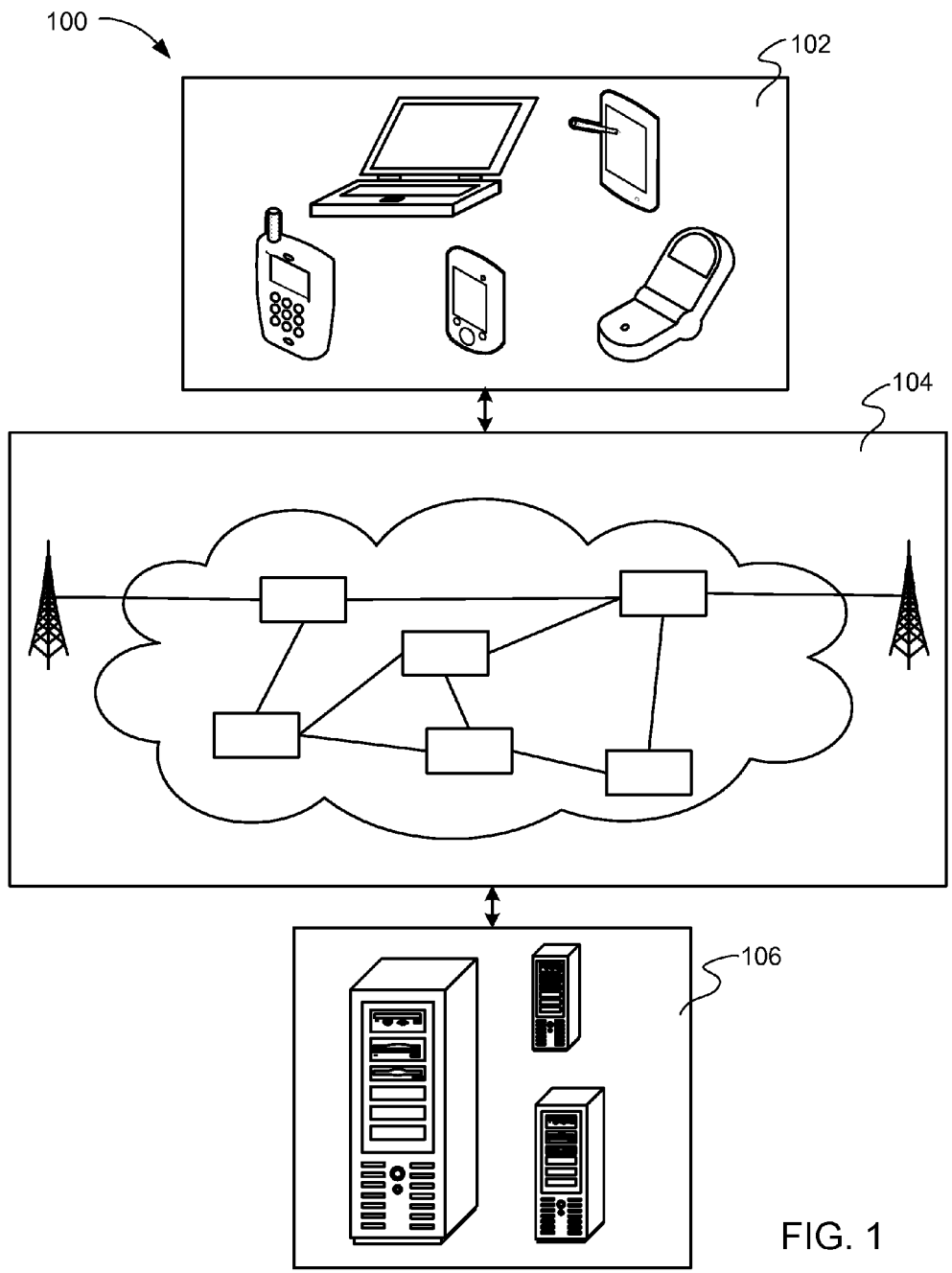
FIG. 1 is an electronic system with display mode mechanism in an embodiment of the present invention.

An embodiment of the present invention can provide best possible use cases in a given orientation. For example a horizontal mode can be optimized for consuming media, reading, watching movies, similar tasks, or combination thereof. A vertical mode can be optimized for viewing lists, navigation menus, carrying out specific, productivity tasks, or combination thereof. The landscape mode can also draw ties to proprietary core products, such as televisions, often used for watching movies or other forms of entertainment which can be consumed in a landscape orientation.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof The term "mode" referred to herein can include a separate functional environment within a broader operating systems architecture (i.e. Productivity Mode view of the OS vs a Consumption Mode view of the OS). It can also be used to describe a smaller more specific user interaction space within a larger mode. For example, a mobile device can have a special kid's mode that is a separate functional space from the rest of the device. While on the home screen, display, or panel in the "kid's mode", a user can invoke "play mode" by turning the device into the horizontal (landscape) orientation.

The terms landscape and horizontal referred to herein can be used interchangeably and are both used to describe holding the device with its longest side horizontal to the ground. Similarly, the terms portrait and vertical referred to herein can be used interchangeably and are both used to describe holding the device with its shortest side horizontal to the ground.

Referring now to FIG. 1, therein is shown an electronic system 100 with display mode mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, phablet, tablet, computer, television, wearable device, public device, or other multi-functional display or entertainment device. The first device 102 can couple, either directly or indirectly, to the communication path 104 to communicate with the second device 106 or can be a stand-alone device.

For illustrative purposes, the electronic system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The first device 102, the second device 106, or combination thereof, can include televisions, wearable devices, computers, public displays, home displays, office displays, retail displays, vehicle displays, industrial displays, or combination thereof. Portrait displays or modes can be preferred and advantageous for some content, modes, functions, applications, controls, images, inputs, or combination thereof. Similarly, landscape displays or modes can be preferred and advantageous for some content, modes, functions, applications, controls, images, inputs, or combination thereof.

For example regarding the televisions, volume, channel, source controls, or combination thereof, can preferably use a portrait mode, display, or configuration. Content guides such as from the cloud, mobile devices, slave devices, devices connected to slave device, or combination thereof, can preferably use a landscape mode, display, or configuration.

For example regarding the wearable devices, basic controls, settings, available applications, or combination thereof, can preferably use a portrait mode, display, or configuration. Content from a device, photos, health notifications, deep content, images that can't be shown on a small screen, advanced controls, a larger viewing window, video being recorded, photos being recorded, a larger controller for a musical instrument such as a wearable instrument, or combination thereof, can preferably use a landscape mode, display, or configuration.

For example regarding the computers, track pad controls, settings, password authentication, power, on/off, restart, limited control of a specific application open on the device, or combination thereof, can preferably use a portrait mode, display, or configuration. Deeper views into content on the computer such as file systems, changing views on contents, open content, view content, play content, control content, or combination thereof, can preferably use a landscape mode, display, or configuration.

For example regarding the public displays, basic controls, access to application program interface (API) features from the display such as context created between two devices including hotel information, hotel check-in, hotel check-out, location in stadium, sports score, user call button, or combination thereof, can preferably use a portrait mode, display, or configuration. Rich content, advanced functionality, rich functionality, sports stadium, menus for in seat concession ordering, deep team stats, deep team content, scores for other sports events, info for other sports events, events, related content, related features, hotel amenities, or combination thereof, can preferably use a landscape mode, display, or configuration.

For example regarding the home displays, basic home automation controls when connected to a large home automation system, home automation controls of individual components of the home automation system, or combination thereof, can preferably use a portrait mode, display, or configuration. Advanced controls, overall controls, status, info on a system, user controls, reports created on home automation status, content from live sensors, content from air temp sensors, content from quality sensors, content from pressure sensors, content from humidity sensors, content from video sensors, content from IR sensors, content from motion sensors, content from sensors that are part of a larger compiled home automation system, or combination thereof, can preferably use a landscape mode, display, or configuration.

For example regarding the office displays, basic access control, feature functionality for a business, feature functionality for a building, or combination thereof, can preferably use a portrait mode, display, or configuration. Directories, content, advanced controls for a location, advanced controls for a business, or combination thereof, can preferably use a landscape mode, display, or configuration.

For example regarding the retail displays, basic payment, point of sale (POS) services, or combination thereof, can preferably use a portrait mode, display, or configuration. Related inventory catalogs, content, event information, deals, discounts, related inventory online, related inventory in another location, related inventory available through a partnership, or combination thereof, can preferably use a landscape mode, display, retail employee access to more inventory, deeper POS controls, advanced customer relation management (CRM), customer service, customer support, controls for other advanced business functions, configuration, or combination thereof, can preferably use a landscape mode, display, or configuration.

For example regarding the vehicle displays, basic controls, unlock controls, start controls, open systems controls, control audio, control power, content sharing functions such as send map from mobile to car system, heads-up-display (HUD) controls, or combination thereof, can preferably use a portrait mode, display, or configuration. Advanced controls to access maintenance systems, maintenance systems, navigation, audio content, video content, advanced settings for all systems, multimedia systems, car CPU, security systems, emergency systems, or combination thereof, can preferably use a landscape mode, display, or configuration.

For example regarding the industrial displays, basic controls, unlock controls, start controls, open systems controls, control audio, control power, content sharing functions such as send map from mobile to car system, heads-up-display (HUD) controls, power on, power off, emergency pause modes, emergency shutdown modes, maintenance notifications, controls to adjust settings within a machine controls to adjust automation within a machine, or combination thereof, can preferably use a portrait mode, display, or configuration. Advanced controls to access maintenance systems, maintenance systems, navigation, audio content, video content, advanced settings for all systems, multimedia systems, car CPU, security systems, emergency systems, display instructional content, display safety content, display maintenance tutorials, display maintenance content, advanced settings to control maintenance systems, settings, notifications, all automation within a machine, or combination thereof, can preferably use a landscape mode, display, or configuration.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof Referring now to FIG. 2, therein is shown an exemplary block diagram of the electronic system 100. The electronic system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the electronic system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units.

The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

Figure 3:
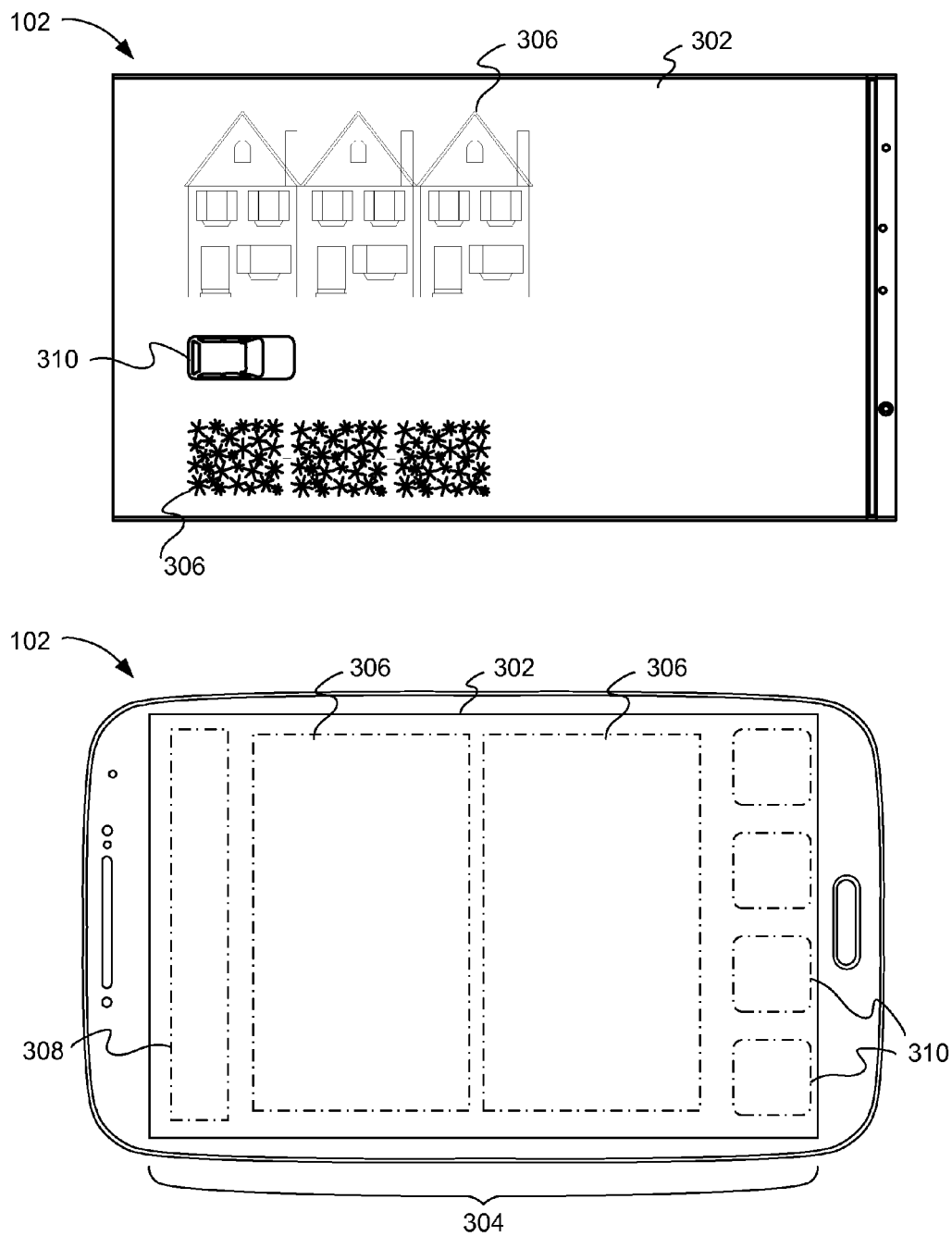
FIG. 3 is examples of a display interface of the first device of FIG. 1.

Referring now to FIG. 3, therein is shown examples of a display interface 302 of the first device 102. Similarly, the second device 106 of FIG. 1 can also include a display interface such as the display interface 302. The display interface 302 can display a format 304 including an image 306, a text 308, a symbol 310, or combination thereof. The format 304 can include the text 308, associated with the image 306, overlapped or wrapped with the text 308.

The image 306, the text 308, or the symbol 310 can represent content specific to preferences, selections, viewing time, or combination thereof. The image 306 can include photos, drawings, or combination thereof. The text 308 can include words or phrases, in columns, paragraphs, headings, or footers. The symbol 310 can include non-ASCII characters, icons, or combination thereof.

Objects including the image 306 the text 308, or the symbol 310 can optionally be radio buttons, selectable, clickable, static, or combination thereof. The content represented by the objects, specific to preferences, selections, viewing time, or combination thereof, can include links to other pages in the same other documents, web sites, web pages, pages in the same document, context, application, or ecosystem.

Selecting, clicking, or activating, the objects preferably provides navigation or access to related content in a format consistent with the format 304. The symbol 310 can also be consistent with the related content and the format 304, and can change dynamically such as symbols 310 based on the related content, selection, activation, or combination thereof. For example, different size, shape, color, configuration, or combination thereof, can distinguish the symbol 310 for playing content, the symbol 310 for getting more information, the symbols for buying a service, or the symbols for buying a product.

For illustrative purposes, the format 304 is shown with the objects that can selected, clicked, or activated for navigation or access to related content although it is understood that hands free activation or navigation such as contextually relevant speech controls may also be used. Similarly, a user of the content of the format 304 may designate content to be read aloud in a predefined language.

It has been discovered that the electronic system 100 with the format 304 utilizing the image 306 the text 308, or the symbol 310 can provide a user with a consistent interface including links to other pages in the same other documents, web sites, web pages, pages in the same document, context, application, or ecosystem. The user can easily navigate and view related content in the same document, context, application, or ecosystem without interruption or distraction.

Figure 4:
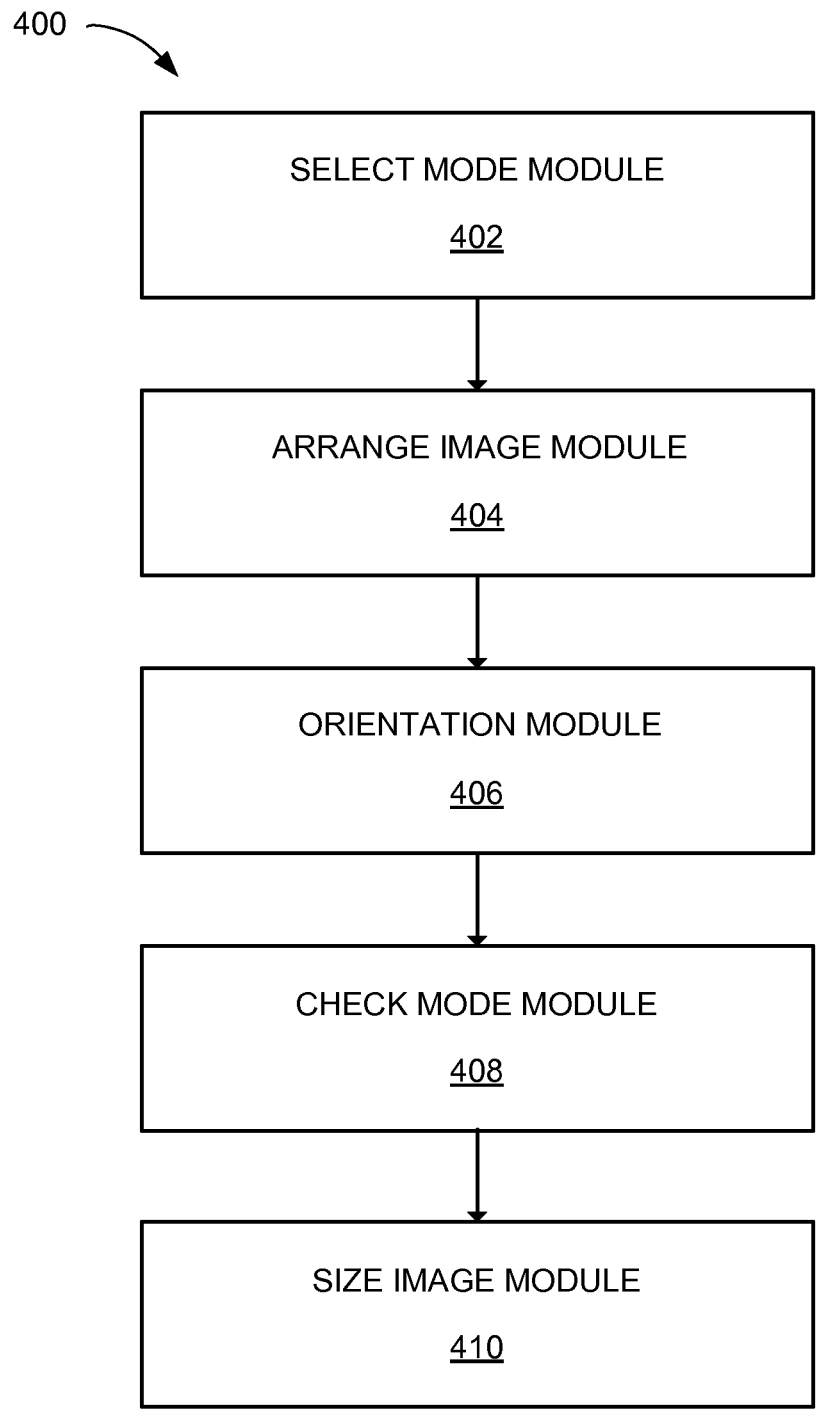
FIG. 4 is an exemplary control flow of the electronic system.

Referring now to FIG. 4, therein is shown an exemplary control flow of the electronic system 100. The electronic system 100 can include a select mode module 402, an arrange image module 404, an orientation module 406, a check mode module 408, a size image module 410, or combination thereof. The select mode module 402, the arrange image module 404, the orientation module 406, the check mode module 408, the size image module 410, or combination thereof can be implemented by the first control unit 212 of FIG. 2, the first storage unit 214 of FIG. 2, the second control unit 234 of FIG. 2, the second storage unit 246 of FIG. 2, or combination thereof.

The electronic system 100 can include a select mode module 402 coupled to the arrange image module 404, the orientation module 406, the check mode module 408, the size image module 410, or combination thereof. The select mode module 402 can include selection of a task, an operation, an application, a multimedia image, an application image, or an event image. The event image can include graphics, an icon, text, or combination thereof The arrange image module 404 can be coupled to the select mode module 402, the orientation module 406, the check mode module 408, the size image module 410, or combination thereof. The arrange image module 404 can group, order, size, scale, crop, or combination thereof, an image or images for display. Arrangement of the image or the images can be based on dimensions of a display such as the first display interface 230 of FIG. 2, the second display interface 240 of FIG. 2, the display interface 302 of FIG. 3, or combination thereof.

The orientation module 406 can be coupled to the select mode module 402, the arrange image module 404, the check mode module 408, the size image module 410, or combination thereof. The orientation module 406 can determine and change an orientation of a display such as the first display interface 230 of FIG. 2, the second display interface 240 of FIG. 2, the display interface 302 of FIG. 3, or combination thereof. Orientation of the image can be based on a physical position, physical motion, or combination thereof, for a device such as the first device 102 of FIG. 1, the second device 106 of FIG. 1, or combination thereof The physical position or physical motion can be distinguished by any N-degree of rotation or motion of the first device 102 or the second device 106. Similarly, screen motions or case motions, such as patterns on a screen or pressure on buttons, can be distinguished by any N-degree of rotation or motion. Multiple distinct modes can be associated with each of the N-degree of rotation or motion. The distinct modes can also be associated with different applications and can be displayed or customized based on automated detection of physical characteristics or events such as display size, location, time, sensed events, or combination thereof.

The distinct operating modes can include an operating system and an application such as Android and Flipboard, Phone Mode vs Television Mode, different functions of an operating system such as an app launcher and a widget launcher, different applications such as Facebook and camera, different virtual machines such as webOS and Windows Phone running in separate virtual machines under a common hypervisor, different operating systems such as iOS and Linux, different states of a switchable entity such as a device's GPS on or off, a remotely connected light switch on or off, or combination thereof The check mode module 408 can be coupled to the select mode module 402, the arrange image module 404, the orientation module 406, the size image module 410, or combination thereof. The check mode module 408 can group, order, size, scale, crop, or combination thereof, an image or images for display. Arrangement of the image or the images can be based on the orientation or the dimensions of the display such as determined by the orientation module 406.

The size image module 410 the select mode module 402, the arrange image module 404, the orientation module 406, the check mode module 408, or combination thereof. The size image module 410 can determine and change extents of an image or images based on the orientation, the arrangement or the dimensions of the display such as determined by the orientation module 406 or the check mode module 408. For example, if the orientation changes from portrait to landscape, a resultant image can include additional graphics, icons, text, or combination thereof. Further for example, if the orientation changes from landscape to portrait, a resultant image can group, order, size, scale, crop, or combination thereof, the image including graphics, icons, text, or combination thereof.

Movements such as case motions, screen motions, signature motions, rotating, flipping, swiveling, swiping, any motion of the device, any motion applied to the device, any motion applied to the screen, or combination thereof, can be learned by the electronic system 100. Learned movements can result in changing modes, orientation, screen images, applications, content, other device functions, or combination thereof.

Figure 2:
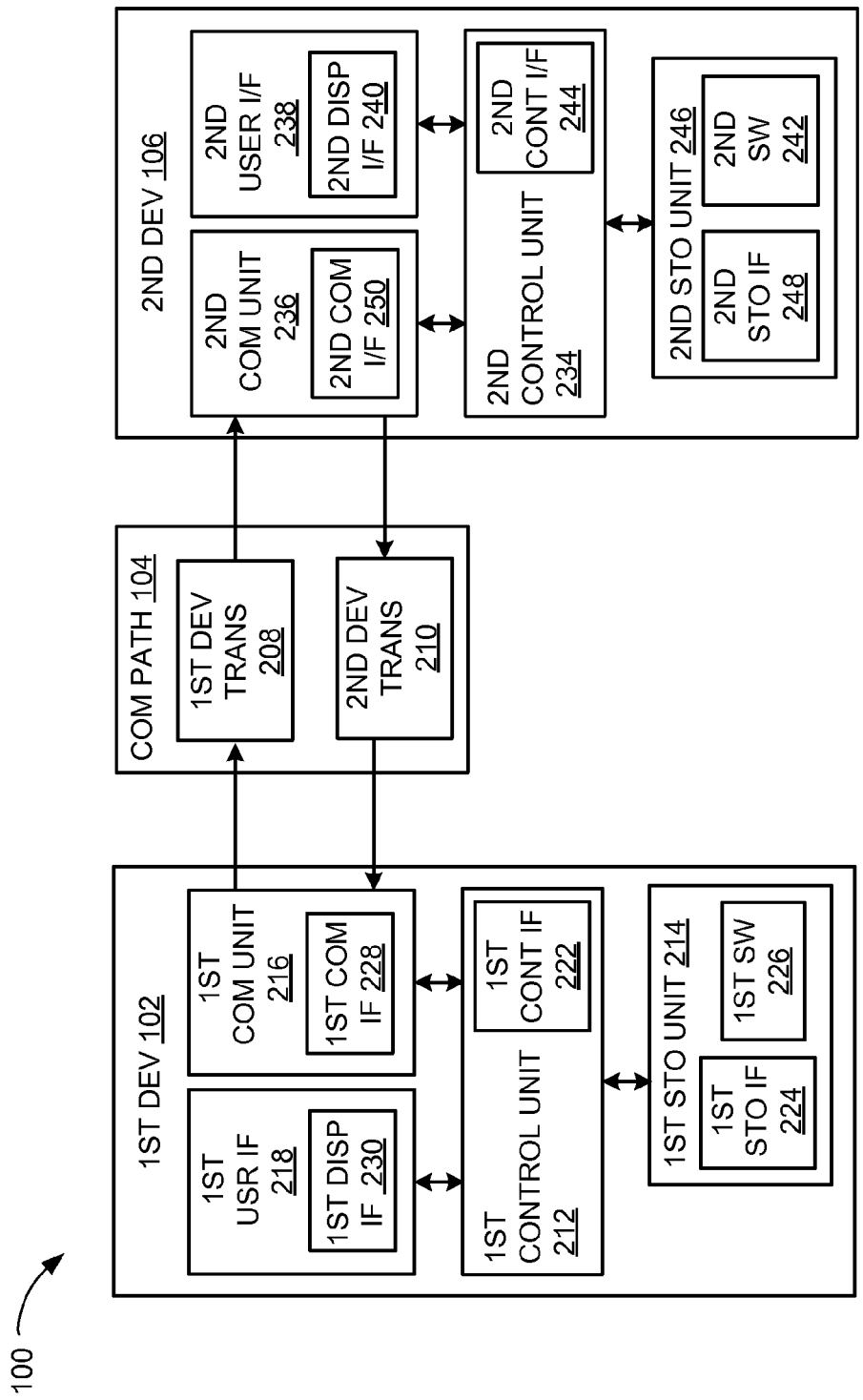
FIG. 2 is an exemplary block diagram of the electronic system.

The modules described in this application can be implemented as instructions stored on a non-transitory computer readable medium to be executed by a first control unit 212 of FIG. 2, the second control unit 234 of FIG. 2, or a combination thereof. The non-transitory computer medium can include the first storage unit 214 of FIG. 2, the second storage unit 246 of FIG. 2, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

The modules described in this application can be part of the first software 226 of FIG. 2, the second software 242 of FIG. 2, or a combination thereof. These modules can also be stored in the first storage unit 214 of FIG. 2, the second storage unit 246 of FIG. 2, or a combination thereof. The first control unit 212, the second control unit 234, or a combination thereof can execute these modules for operating the electronic system 100.

The electronic system 100 has been described with module functions or order as an example. The electronic system 100 can partition the modules differently or order the modules differently. For example, the select mode module 402 can include the arrange image module 404 and the orientation module 406 as separate modules although these modules can be combined into one. Also, the orientation module 406 can be split into separate modules for implementing different modes of detection in the separate modules. Similarly the size image module 410 can be split into separate modules for implementing different modes of sizing.

The modules described in this application can be hardware implementation, hardware circuitry, or hardware accelerators in the first control unit 212 of FIG. 2 or in the second control unit 234 of FIG. 2. The modules can also be hardware implementation, hardware circuitry, or hardware accelerators within the first device 102 or the second device 106 but outside of the first control unit 212 or the second control unit 234, respectively.

Figure 5:
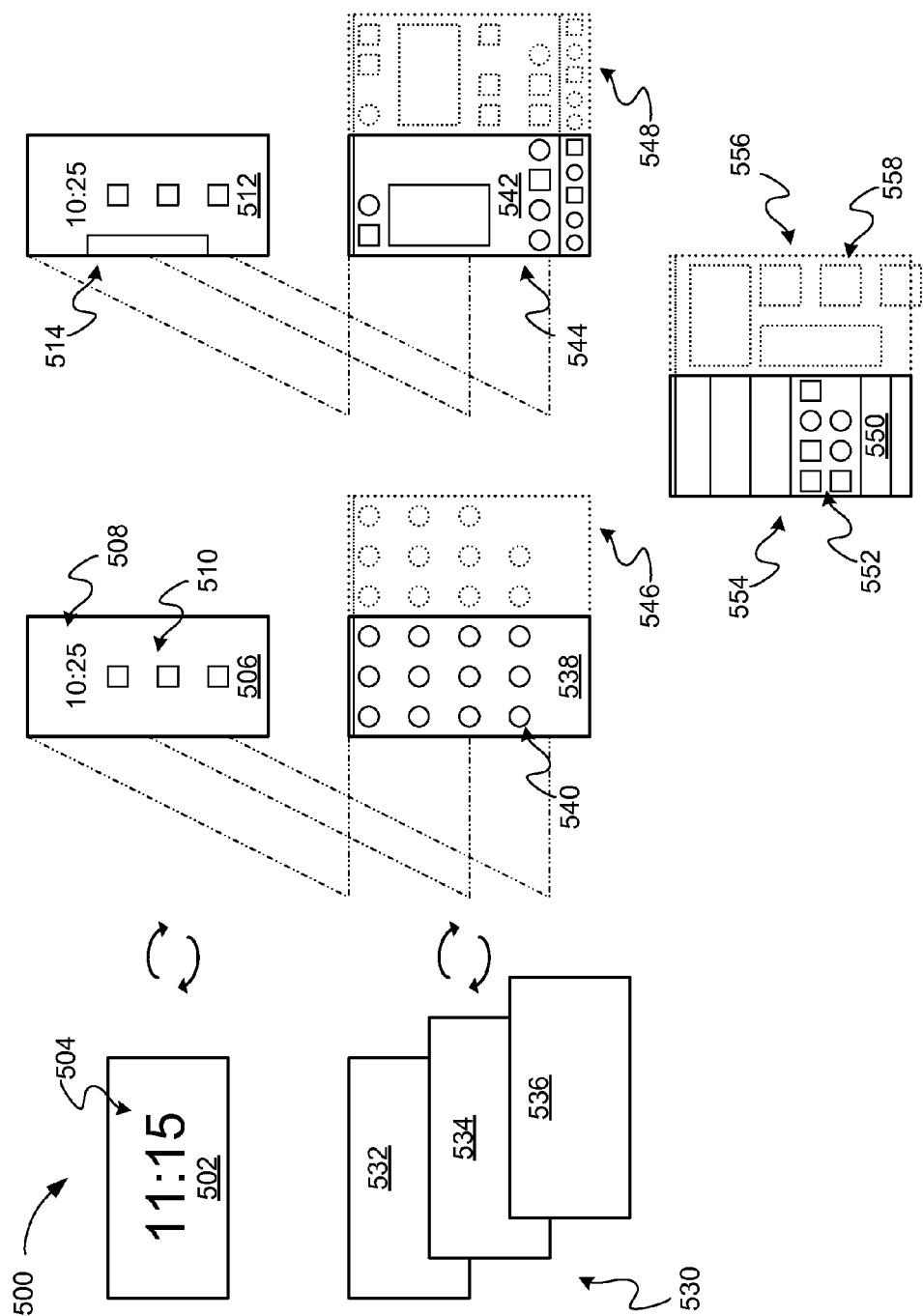
FIG. 5 is a plan view of the electronic system in an exemplary embodiment.

Referring now to FIG. 5, therein is shown a plan view 500 of the electronic system 100 in an exemplary embodiment. The plan view 500 depicts a shell architecture of the display or screen of the first device 102 of FIG. 1. All displays or screens can preferably be integrated with visual hi-fidelity assets and motion.

A signature clock 504 can be displayed in a lock screen landscape mode 502. For example, a signature motion such as rotating the first device 102 can result in a first lock screen portrait mode 506 with a small clock 508 and icons 510 such as SideCast. Alternatively or additionally, a second lock screen portrait mode 512 can display a lock screen touch display 514 such as TouchWiz+®. For example, the first lock screen portrait mode 506 or SideCast display can receive first priority after rotating.

A home panel landscape mode 530 can include an always on display 532, a flipboard display 534, or a widget display 536. For example, a signature motion such as rotating the home panel landscape mode 530 can result in a first home panel portrait mode 538 with icons 540 such as SideCast. Alternatively or additionally, a second home panel portrait mode 542 can display a home panel touch display 544 such as TouchWiz+®. For example, the first lock screen portrait mode 506 or SideCast display can receive first priority after rotating.

The first home panel portrait mode 538 can also include an auxiliary first home panel portrait screen 546. The auxiliary first home panel portrait screen 546 can include additional of the icons 540, graphics, text, or combination thereof, associated with the first home panel portrait mode 538. Similarly, the second home panel portrait mode 542 can also include an auxiliary second home panel portrait screen 548. The auxiliary second home panel portrait screen 548 can include additional of the icons 540, graphics, text, or combination thereof, associated with the second home panel portrait mode 542. The auxiliary first home panel portrait screen 546, the second home panel portrait mode 542, or combination thereof can also provide an all applications mode or screen mode, a unified communication mode or screen, or combination thereof.

Further, a basement portrait mode 550 can include an application display such as an App Drawer. The basement portrait mode 550 can include icons 552 for applications. The basement portrait mode 550 can also include an auxiliary basement portrait screen 556, such as a Widget Library. The auxiliary basement portrait screen 556 can include widgets 558, the icons 552, graphics, images, or combination thereof It has been discovered that the electronic system 100 can provide an enhanced and a pleasurable user experience by utilizing sensors such as gyroscopic sensor within mobile devices. By physically rotating a device between various orientations of the device, such as landscape, portrait, front, back, 180 degrees, top vs bottom, or combination thereof, the user can quickly switch between different tasks, functions, or use modalities.

Further, it has been discovered that the electronic system 100 can provide best possible use cases in a given orientation. For example a horizontal mode can be optimized for consuming media, reading, watching movies, similar tasks, or combination thereof. A vertical mode can be optimized for viewing lists, navigation menus, carrying out specific, productivity tasks, or combination thereof. The landscape mode can also draw ties to proprietary core products, such as Samsung televisions, often used for watching movies or other forms of entertainment which can be consumed in a landscape orientation.

Figure 6:
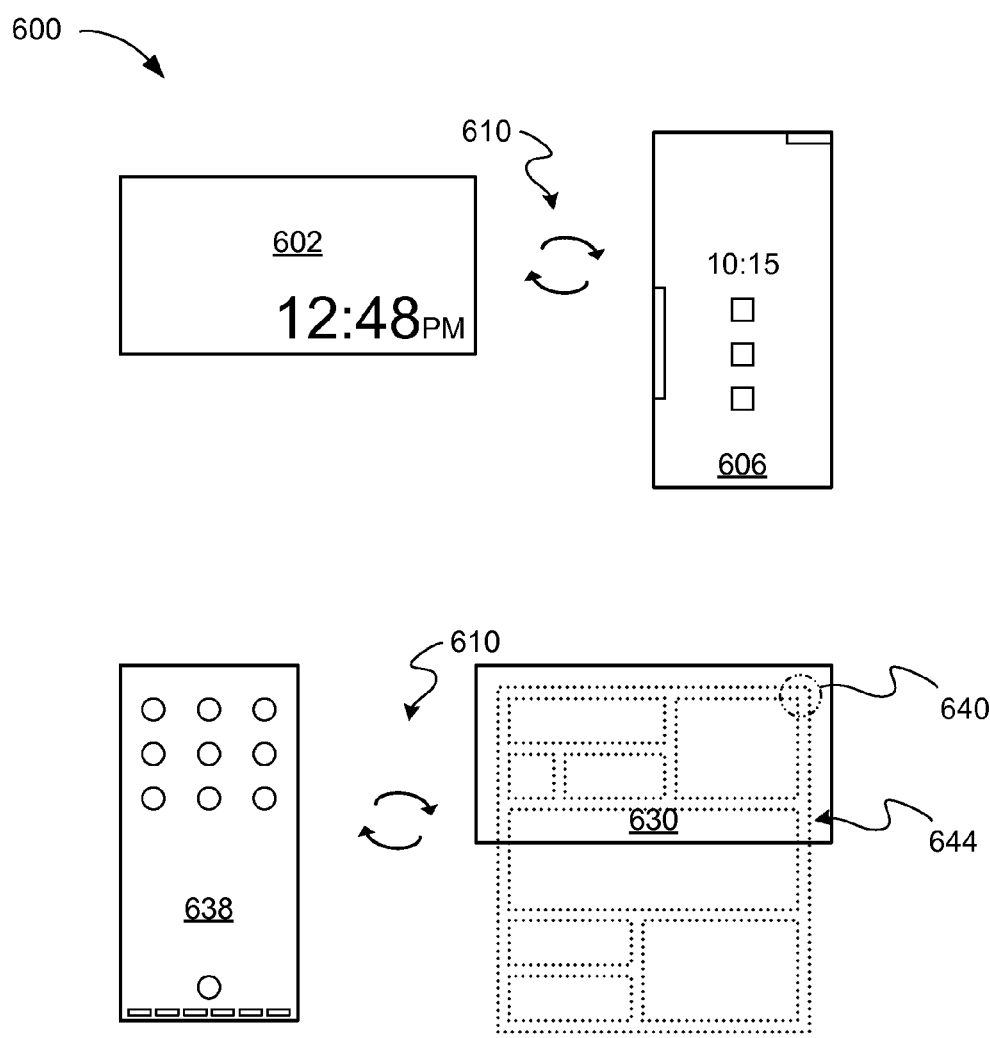
FIG. 6 is a plan view of the electronic system in an exemplary embodiment.

Referring now to FIG. 6, therein is shown a plan view 600 of the electronic system 100 in an exemplary embodiment. In a manner similar to the plan view 500 of FIG. 5, a lock screen landscape mode 602 appears at the lock layer as a signature horizontal lock screen that is more cinematic and visual than a lock screen portrait mode 606. The display of the first device 102 of FIG. 1 can include a physical motion 610, such as a rotation, from the lock screen landscape mode 602 to display the lock screen portrait mode 606.

Also in a manner similar to the plan view 500, an unlocked landscape mode 630 can result from the physical motion 610, such as rotating, applied to an unlocked portrait mode 638. The unlocked landscape mode 630 can be embodied on a main home layer as a personalized content layer. For example the unlocked landscape mode 630 can provide personalized content such as Flipboard, Widgets, or Always On. Tapping on a corner 640 such as a hidden button can switch the unlocked landscape mode 630 between modes such as Selected Widgets, Always On, or Flipboard. For example, tapping the corner 640 can switch the mode to display widgets 644.

The physical motion 610, such as a further rotation in an opposite direction, can also provide easy return to a last launch experience such as the previous mode, screen, content, application, context, action, interaction, or combination thereof. The return to the last launch experience can provide efficiency between modes or easy return in a case of accidental rotation. Further of the physical motion 610, such as a further rotation in a same direction, can provide additional modes, such as switching between a unified communication mode, an application mode, and an entertainment or media mode.

The lock screen landscape mode 602 and the lock screen portrait mode 606 can include relevant information to one another. The relevant information can provide additional information or content based on a previous content, such as information or content for current location, context, who is nearby, what is going on nearby, an expansion view of previous content, an exploration view of previous content, or combination thereof. For example, one of the lock screen landscape mode 602 or the lock screen portrait mode 606 can provide a "seed" for further exploration. As a further example, a portrait view can be characterized by "get the work done, get to the point" and a landscape view can provide a "flow" of information or content. Similarly, the unlocked portrait mode 638 and the unlocked landscape mode 630 can include relevant information to one another.

It has been discovered that the electronic system 100 rotating the lock landscape mode 602, the unlocked portrait mode 638, the lock screen portrait mode 606, the unlocked landscape mode 630, or combination thereof, takes advantage of an opportunity for improved user experience on mobile devices utilizing both physical and/or gestural interaction as well as touch display interaction. This innovation utilizes the capabilities of mobile devices to detect physical orientation of and rotation of the device in order to deliver an enhanced user experience.

Further it has been discovered that the electronic system can utilize physical rotation and change of orientation of a device at a core operating system (OS) level to seamlessly move between two different use modes or tasks. This can be implemented at the lock screen level, home screen or panel level, as well as any other location in the OS architecture.

Figure 7:
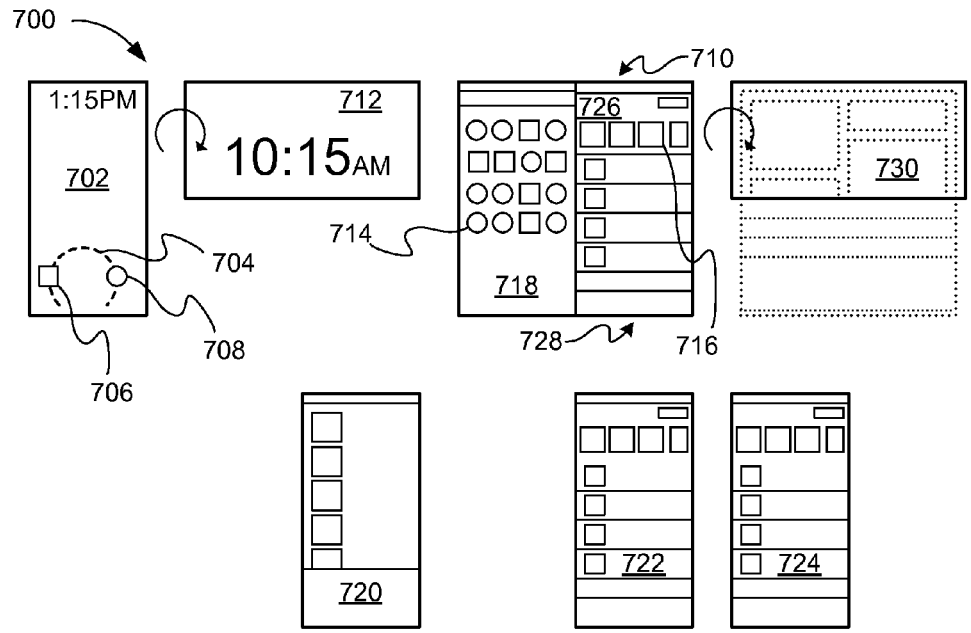
FIG. 7 is a plan view of the electronic system in an exemplary embodiment.

Referring now to FIG. 7, therein is shown a plan view 700 of the electronic system 100 in an exemplary embodiment. The plan view 700 can include a lock screen portrait mode 702. The lock screen portrait mode 702 can include a directional unlock 704. Unlocking in the direction of a first icon 706 can result in a display of a first unlocked portrait mode 718 such as a categorized applications screen. Alternatively, unlocking in the direction of a second icon 708 can result in a display of a second unlocked portrait mode 710 such as a unified communication screen.

Selecting a first portrait mode icon 714, such as an application icon, in the first unlocked portrait mode 718 can launch an application mode 720. Similarly, selecting a second portrait mode icon 716, such as communication icon, in the second unlocked portrait mode 710 can launch a first communication channel mode 722, such as an email channel, or a second communication channel mode 724, such as a short message service (SMS) channel.

The second unlocked portrait mode 710 can include a top bar 726 with all channels of communication such as the second portrait mode icon 716. Selecting, such as tapping on a channel such as the second portrait mode icon 716, can provide in a display area 728 below the top bar for updates with content in the selected communication channel or content channel. Thus, a user can quickly see what is new in each of the communication channels.

Also, in a manner similar to the plan view 600 of FIG. 6, rotating the lock screen portrait mode 702 can result in a lock screen landscape mode 712. Further, rotating the first unlocked portrait mode 718 or the second unlocked portrait mode 710 can result in an unlocked landscape mode 730 such as a widget drawer.

It has been discovered that the electronic system 100 with the directional unlock 704 and rotation of the first device 102 of FIG. 1, can take advantage of the ability on mobile device to sense rotation and orientation of the device in order to deliver unique and valuable user experiences optimized for a variety of different modalities as use cases. The different modes or content in lock screen modes or unlocked home layer screen or panel modes based on specific motion patterns provides significantly increased functions.

It has been further discovered that the electronic system 100 can include two or more distinct operating modes for the device; one or more modes is active when the device is in vertical or portrait orientation, and the other one or more modes is active in horizontal or landscape orientation. Rotating the first display interface 230 of FIG. 2, the second display interface 240 of FIG. 2, the display interface 302 of FIG. 3, or combination thereof, of the first device 102 from vertical to horizontal or horizontal to vertical results in switching the display of the first device 102 from one mode to another.

Figure 8:
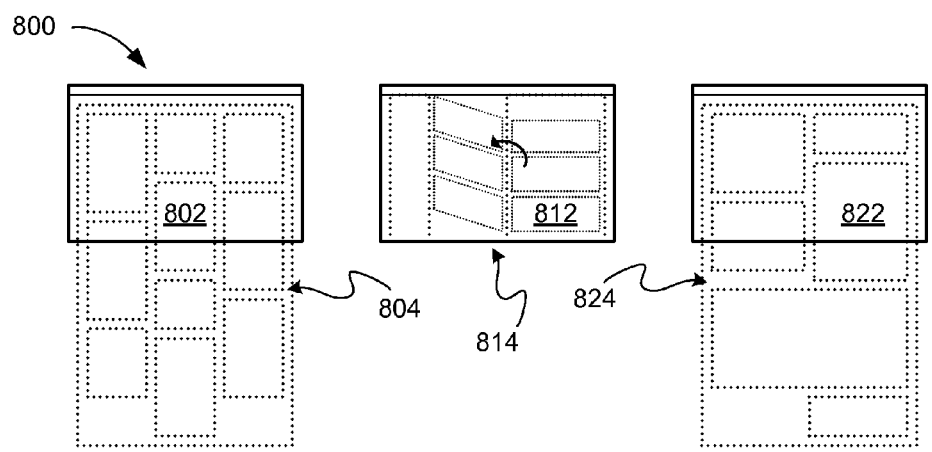
FIG. 8 is a plan view of the electronic system in an exemplary embodiment.

Referring now to FIG. 8, therein is shown a plan view 800 of the electronic system 100 in an exemplary embodiment. The electronic system 100 can preferably populate a landscape mode with content services. The content services can include an always on mode 802, a flipboard mode 812, a widget mode 822, or combination thereof.

The always on mode 802 can include always on images 804 such as active applications, windows, feeds, or combination thereof. The images 804 can be always on, updated in real time, selected to access or open additional content, or combination thereof.

The flipboard mode 812 can include flipboard images 814 such as document pages. The flipboard images 814 can be flipped or turned in a manner similar to a book, magazine, other print material, or combination thereof.

The widget mode 822 can include widget images 824 such as clocks, weather, box scores, schedules, or combination thereof. The widget images 824 can be updated in real time, selected to access or open additional content, or other applications, or combination thereof.

Figure 9:
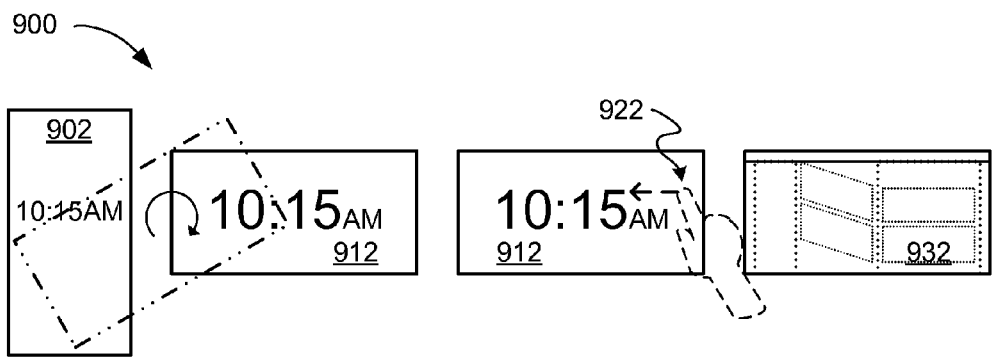
FIG. 9 is a plan view of the electronic system in an exemplary embodiment.

Referring now to FIG. 9, therein is shown a plan view 900 of the electronic system 100 in an exemplary embodiment. The electronic system 100 can provide mode changes with both physical motion, such as rotation, of the first device 102 of FIG. 1 or the second device 106 of FIG. 1, as well as motion, such as a swipe using a finger or stylus, on a display such as the first display interface 230 of FIG. 2, the second display interface 240 of FIG. 2, the display interface 302 of FIG. 3, or combination thereof.

Rotating the first device 102 or the second device 106 can switch a portrait lock screen mode 902 to a lock screen landscape mode 912. A screen motion 922, such as a horizontal swipe of a finger, stylus, recognizable implement or combination thereof, can switch the lock screen landscape mode 912 to an unlocked landscape mode 932 such as a content screen mode including a flipboard mode, always on mode, widget mode, any other mode, or combination thereof.

The screen motion 922 can be horizontal, vertical, left to right, right to left, tap on a location, any motion on a display screen, any motion on a case, or combination thereof. The screen motion 922 can provide locking, unlocking, mode switching, scrolling, launching, closing, selecting, confirming, denying, any command, any operation, any function, or combination thereof.

It has been discovered that the electronic system with the screen motion 922 can provide an orientation change with a physical gesture such as a swipe or a tap on a screen or a case. The physical gesture including the swipe on the screen or the tap on the case can result in switching form one mode to another mode.

Figure 10:
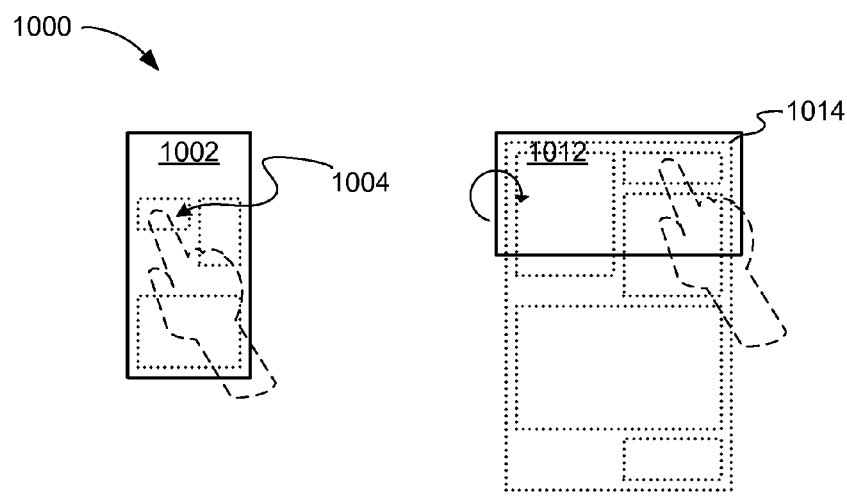
FIG. 10 is a plan view of the electronic system in an exemplary embodiment.

Referring now to FIG. 10, therein is shown a plan view 1000 of the electronic system 100 in an exemplary embodiment. The electronic system 100 can provide interaction between orientations, modes, screens, applications, any interface, or combination thereof. The interaction can include moving, copying, accessing, launching, locking, unlocking, mode switching, scrolling, closing, selecting, confirming, denying, any command, any operation, any function, or combination thereof. The interaction can include data, images, icons, widgets, documents, applications, other screen elements, or combination thereof.

For example, a portrait mode 1002 can include an image 1004 such as a widget. The image 1004 can be copied or moved from the portrait mode 1002 to a landscape mode 1012. A rotation of the display or the screen motion 922 of FIG. 9 can result in a switch from the portrait mode 1002 to a landscape mode 1012. The image 1004 can be resized or oriented based on display size, location, other images, viewability, other display factors, or combination thereof. Similarly, the image 1004 can also be copied or moved from the landscape mode 1012 to the portrait mode 1002. In any case, access in any mode can be provided for the image 1004 such as data, images, icons, widgets, documents, applications, other screen elements, or combination thereof.

It has been discovered that the electronic system 100 with switching from one mode to another mode can also provide interaction between the modes such as moving, copying, accessing, launching, locking, unlocking, mode switching, scrolling, closing, selecting, confirming, denying, any command, any operation, any function, or combination thereof.

Figure 11:
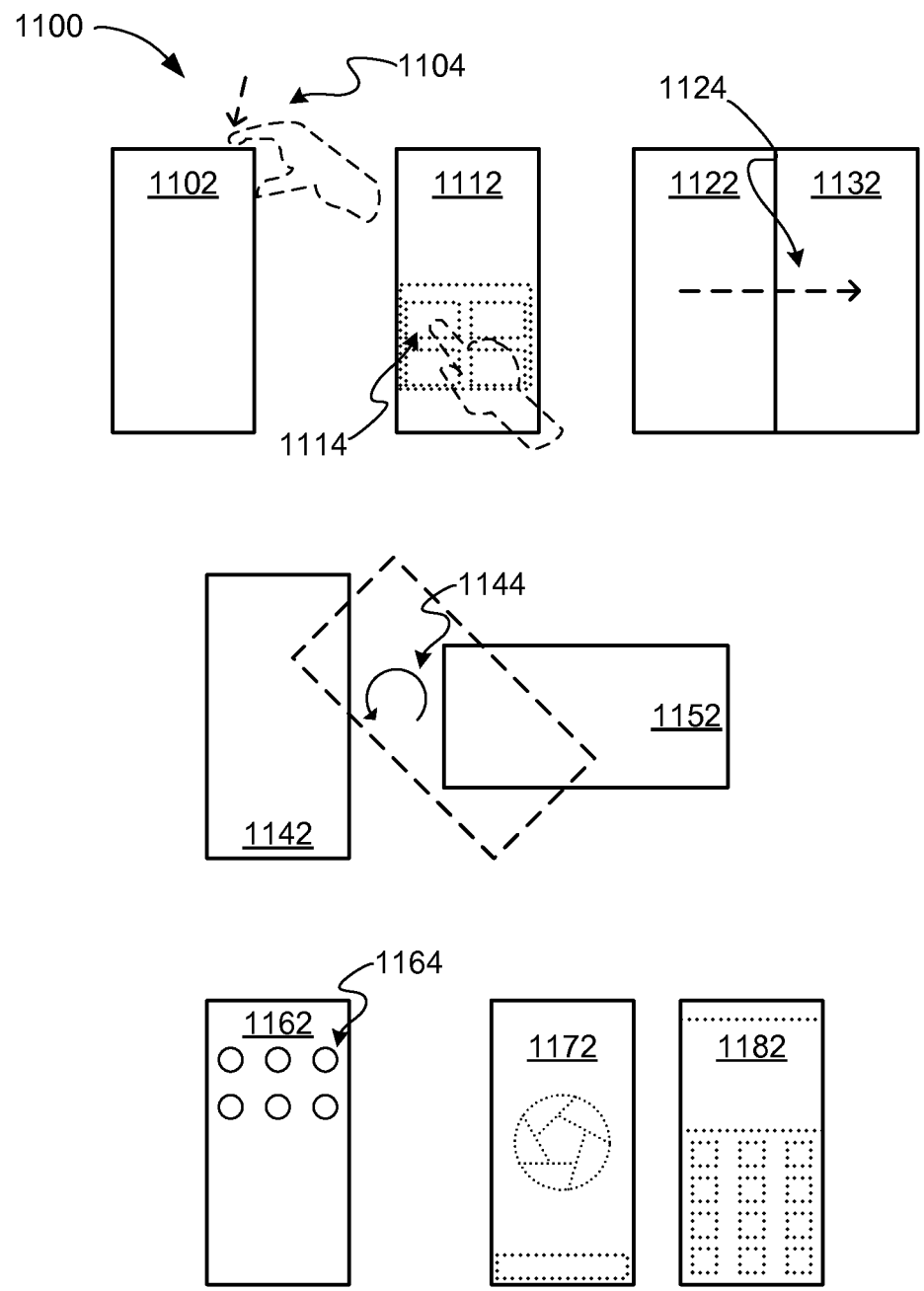
FIG. 11 is a plan view of the electronic system in an exemplary embodiment.

Referring now to FIG. 11, therein is shown a plan view 1100 of the electronic system 100 in an exemplary embodiment. The electronic system 100 can provide a switcher mode 1102 that can include a "Kid's Mode". The switcher mode 1102 can provide device options such as the "Kid's Mode", an airplane mode, a silent mode, a power off function, other applications, other modes, or combination thereof.

Providing a case motion 1104, such as a long press on a power button, can activate or result in the switcher mode 1102. Selecting a mode with a first screen motion 1114, such as a press on a location, can provide a first portrait content mode 1112 such as the "Kid's Mode". In a second portrait content mode 1122, a second screen motion 1124 can pan to view other panes of a display screen such as a third portrait content mode 1132 The "Kid's Mode" can include background parallaxes, background animation, other display screen effects, of combination thereof.

The use of landscape mode within a larger "Kid's Mode" can turn a device into an interactive play space for the child to play in. These play spaces could have a variety of different themes, games and interaction models that can interact across a Kid's Mode user interface (UI). The landscape mode can also invoke brand sponsored games, experiences, or combination thereof. A device motion 1144, such as rotating, can be applied to a fourth portrait content mode 1142 resulting in a landscape content mode 1152 such as an interactive, animated background mode including objects with which a user or child can play.

A fifth portrait content mode 1162 can include images 1164 such as icons, symbols, buttons, other images, or combination thereof. Selecting an image 1164 can launch or open other portrait content modes. For example, selecting the image 1164 can launch a sixth portrait content mode 1172 such as a camera. The sixth portrait content mode 1172 can include a "Kid's Mode" camera designed and configured for a younger user. Also for example, selecting the image 1164 can launch a seventh portrait content mode 1182 such as a calculator. The seventh portrait content mode 1182 can include a calculator designed and configured for a younger user.

The sixth portrait content mode 1172 implemented as a camera, and camera modes in all embodiments, can include a mode switch lock switch, a horizontal mode lock, a vertical mode lock, or combination thereof. These locks can prevent mode switching during camera operation particularly during multiple exposures or extended operation.

It has been discovered that the electronic system 100 with the case motion 1104, the first screen motion 1114, the second screen motion 1124, and the switcher mode 1102, can provide an easily accessible environment with applications and modes for younger users such as the "Kid's Mode".

Figure 12:
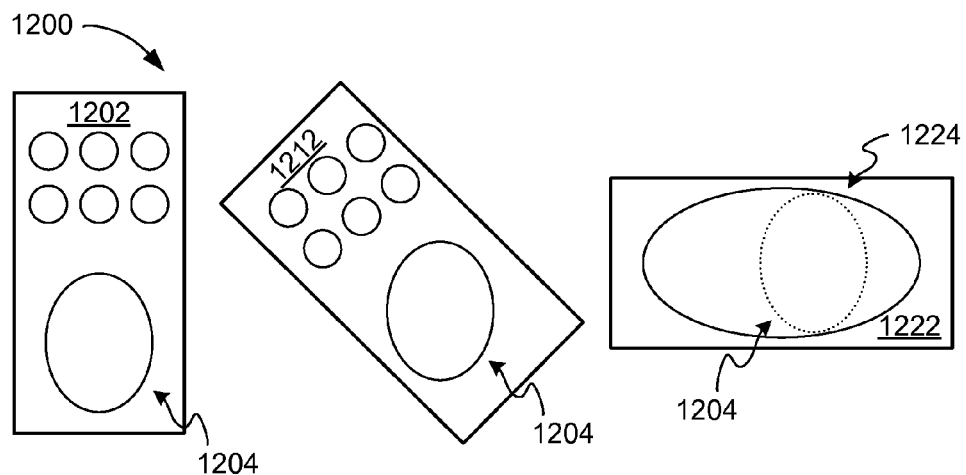
FIG. 12 is a plan view of the electronic system in an exemplary embodiment.

Referring now to FIG. 12, therein is shown a plan view 1200 of the electronic system 100 in an exemplary embodiment. The electronic system 100 can provide mode changes with simple physical motion, such as rotation, of the first device 102 of FIG of FIG. 1 or the second device 106 of FIG. 1. The simple mode change can be particularly appropriate for younger users in the "Kid's Mode".

A portrait mode 1202 can include an image 1204 such as an interactive, animated background mode including objects with which a user or child can play. The first device 102 or the second device 106 can be rotated to switch the display from the portrait mode 1202 to an intermediate mode 1212 and a landscape mode 1222.

The image 1204 such as the interactive, animated background mode can maintain a viewing position in the intermediate mode 1212 and be part of a landscape image 1224 that can be an expanded image, an extended image, or a previously hidden image.

It has been discovered that the electronic system 100 with "Kid's Mode" can maintain a viewing position of the image 1204 while rotated to switch the display from the portrait mode 1202 to the landscape mode 1222, or to switch from the landscape mode 1222 to the portrait mode 1202.

Figure 13:
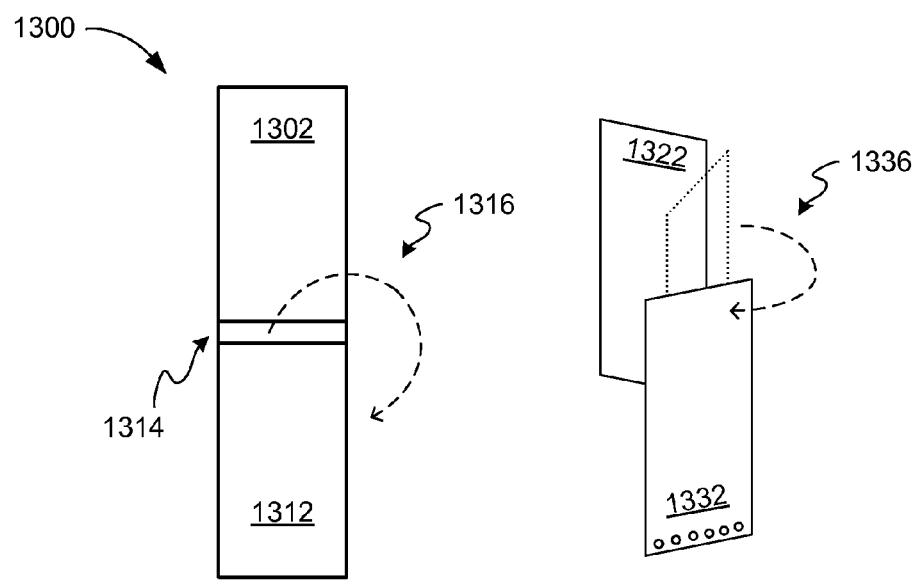
FIG. 13 is a plan view of the electronic system in an exemplary embodiment.

Referring now to FIG. 13, therein is shown a plan view 1300 of the electronic system 100 in an exemplary embodiment. The electronic system 100 can switch between modes or content layers of a display such as the first display interface 230 of FIG. 2, the second display interface 240 of FIG. 2, the display interface 302 of FIG. 3, or combination thereof, with physical motion of device such as the first device 102 of FIG. 1 or the second device 106 of FIG. 1.

For example, the device displaying a first portrait mode 1302, such as an application mode, can be rotated one-hundred eighty degrees (180°) to switch to a display an second portrait mode 1312 such as a media lens mode. The device can include pivots 1314, such as bar pivots, at an axis of rotation. The pivots 1314 can provide a hardware pivot point. For illustrative purposes, a first physical motion 1316 is shown as a rotation although it is understood that the first physical motion 1316 can be any motion.

Further for example, another device, such as the first device 102 or the second device 106, displaying a front portrait mode 1322 such as an application mode, can flipped from front to back for displaying a back portrait mode 1332 such as a unified communication mode. The another device preferably has two screens on opposite sides. For illustrative purposes, a second physical motion 1336 is shown as a rotation although it is understood that the second physical motion 1336 can be any motion.

It has been discovered that the electronic system 100 can switch between modes or content layers of the display with the first physical motion 1316 or the second physical motion 1336. For example, one-hundred eighty degree rotation or front to back flip can each provide simple but distinct switching between modes or content layers.

Further it has been discovered that the electronic system 100 with the first physical motion 1316 or the second physical motion 1336 can implement successive motions for additional simple but distinct switching between yet more modes or content layers.

Figure 14:
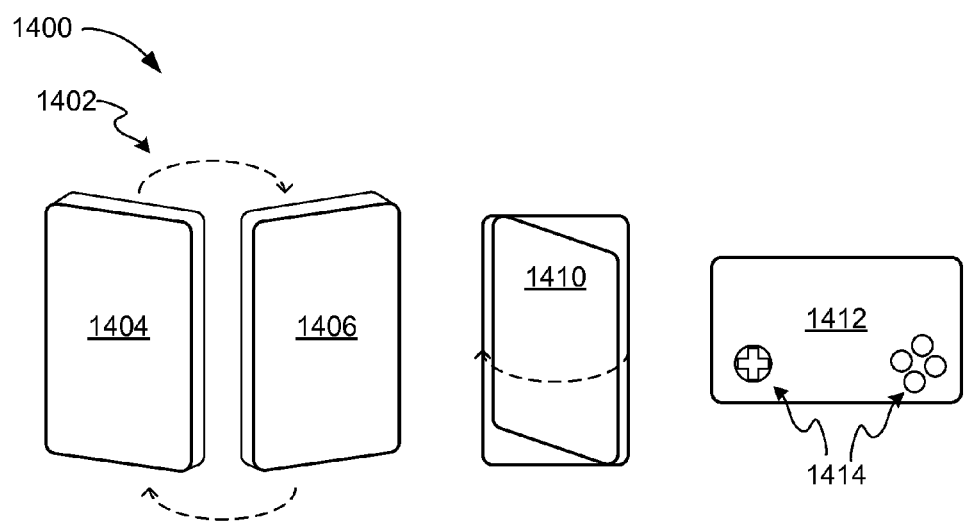
FIG. 14 is an electronic system in an exemplary embodiment.

Regarding FIG. 14, therein is shown an electronic system 1400 in an exemplary embodiment. The electronic system 1400 can include a device 1402, such as the first device 102 of FIG. 1 or the second device 106 of FIG. 1. The device 1402 preferably includes screens or displays on two opposite sides such as a first display side 1404 and a second display side 1406. For example the first display side 1404 can display a productivity mode with applications and unified communications. The second display side 1406 can display a media and entertainment mode.

The device 1402 can also switch modes or content layers digitally without the need for a physical motion or actual hardware flip. A screen display 1410 can be flipped, switched, rotated, changed, or combination thereof. The screen display 1410 can "flip" between the productivity mode, the entertainment mode, or any other mode. For illustrative purposes, the screen display 1410 is shown with a motion arrow indicating a rotation, although it is understood that any other display change may be implemented.

The device 1402 can also include a control side 1412. The control side 1412 can include buttons 1414 such as hard buttons, soft buttons, any control element, or combination thereof. The buttons 1414 can better enable a gaming experience with either hard buttons or soft buttons. For illustrative the buttons 1414 are shown in a shape similar to a gaming controller although it is understood that the buttons 1414 can be of any size, shape, or configuration.

It has been discovered that the device 1402 with the first display side 1404 and the second display side 1406 can provide a unique experience with two display screens with existing operating systems. The two display screens on opposite sides can provide additional always on functions.

Figure 15:
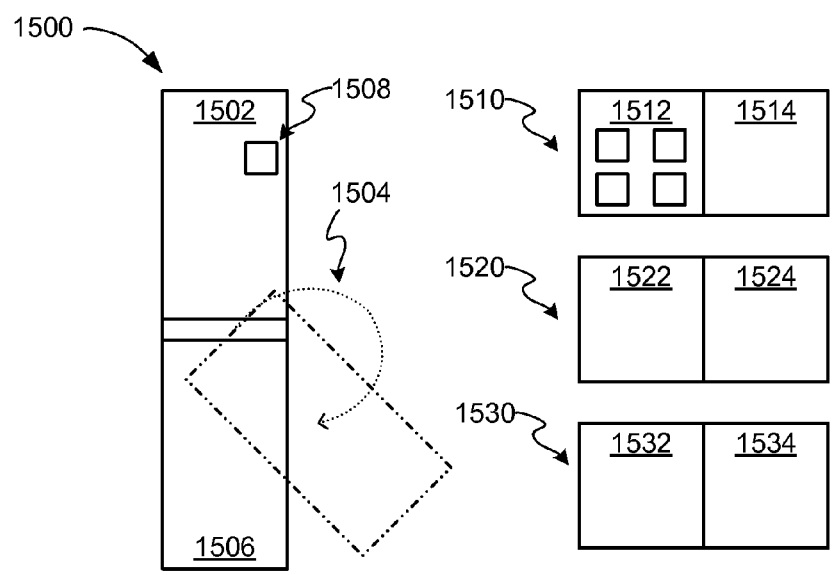
FIG. 15 is a plan view of the electronic system in an exemplary embodiment.

Referring now to FIG. 15, therein is shown a plan view 1500 of the electronic system 100 in an exemplary embodiment. The electronic system 100 can provide mode changes by moving a device such as the first device 102 of FIG. 1 or the second device 106 of FIG. 1. The mode changes can include an in-between mode.

A first portrait mode 1502, such as an application and unified communication mode, can be switched with a physical motion 1504 to a second portrait mode 1506 such as a media entertainment browsing mode. Similarly the second portrait mode 1506 can be switched to the first portrait mode 1502 with a same motion, an opposite motion, or combination thereof. The physical motion 1504 can rotate the device one-hundred eighty degrees resulting in switching between modes.

For example, with the device between the first portrait mode 1502 with an icon 1508 and the second portrait mode 1506, an in-between or intermediate mode, such as a horizontal orientation, can be displayed in a first landscape mode 1510. The first landscape mode 1510 can include a first quick mode 1512, such as an applications and unified communication quick mode, and a second quick mode 1514, such as a media and entertainment quick mode. The first quick mode 1512 and the second quick mode 1514 can provide a selected portion of the first portrait mode 1502, including the icon 1508 such as a quick launch shortcut, and the second portrait mode 1506, respectively.

Further for example, with the device between the first portrait mode 1502 and the second portrait mode 1506 a second landscape mode 1520 can be displayed. The second landscape mode 1520 can include a third quick mode 1522, such as a quick launch mode with selected icons, and a fourth quick mode 1524, such as a quick launch mode with additional selected icons.

Yet further for example, with the device between the first portrait mode 1502 and the second portrait mode 1506 a third landscape mode 1530 can be displayed. The third landscape mode 1530 can include a fifth quick mode 1532, such as a summary mode with selected notification icons, and a sixth quick 1534, such as a summary mode with music player controls.

For illustrative purposes, two quick modes are shown although it is understood that any number of the quick modes may be implemented in the landscape mode.

It has been discovered that the electronic system with the physical motion 1504 to switch between modes can provide an in-between or intermediate mode with multiple quick modes. The multiple quick modes can be similar to the initial modes or may be different, to provide additional modes and functions.

Figure 16:
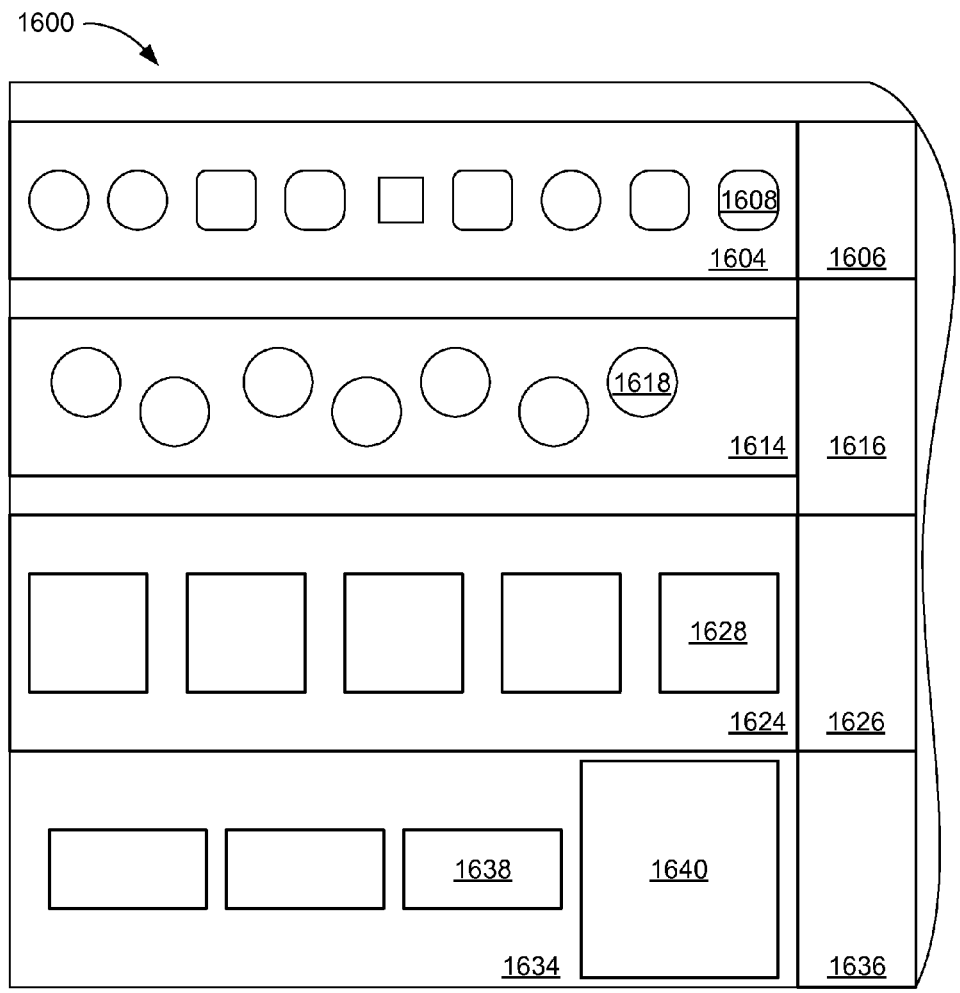
FIG. 16 is a plan view of the electronic system in an exemplary embodiment.

Referring now to FIG. 16, therein in shown a plan view 1600 of the electronic system 100 in an exemplary embodiment. The electronic system 100 can include an unlocked landscape mode 1602. The unlocked landscape mode 1602 can include links to email, short message service (SMS), phone calls, applications, other elements, or combination thereof. Screen images such as links, icons, symbols, other elements, or combination thereof, can be displayed in a predetermined order.

The screen images can be arranged in bands. The bands can be ordered in a different way and feature different sizes to help with distinction and user orientation. Some bands with Timeline items feature a progressive disclosure functionality which allows the user preview the message item and interact immediately. Main buttons, such as "band heads" can notify the user about new Timeline events.

A Timeline feature or mode can be integrated in an operating system of a device such as a mobile phone, tablet, mobile device, or combination thereof. The Timeline feature or mode can record important events and can display them in ordered bands or layers, such a horizontally. As an example, a chronological order can be displayed from the right, such as current, to the left, such as past. The ordered bands can connect to any type of notification, user interaction, other event, or combination thereof As another example, in an embodiment, the bands can accumulate and cluster a broader range of events, such as all communication events, all entertainment events, all discovery events, or combination thereof. Displayed items in the Timeline feature or mode can be interactive and "tapable". Tapping a Timeline item can launch an application that is connected with the Time line item. If the Timeline item was triggered by an operating system (OS) event, an interaction can be a direct action such as reverting a setting, undelete, restore, other actions, or combination thereof.

For example, the unlocked landscape mode 1602 can include a first Timeline band 1604, such as an application band, can be identified by a first symbol 1606, such as an application grid symbol or main button. The first Timeline band 1604 can include first icons 1608, such as links with application symbols.

Also for example, a second Timeline band 1614, such as an email band, can be identified by a second symbol 1616, such as a postal letter symbol or main button. The second Timeline band 1614 can include second icons 1618, such as links with photos and names for email contacts.

Further for example, a third Timeline band 1624, such as a phone band, can be identified by a third symbol 1626, such as a phone receiver symbol or main button. The third Timeline band 1624 can include third icons 1628, such as a links with photos and names for phone contacts.

Yet further for example, a fourth Timeline band 1634, such as a message band, can be identified by a fourth symbol 1636, such as a conversation bubble symbol or main button. The fourth Timeline band 1634 can include fourth icons 1638, such as links with a photos and names for short message service (SMS) contacts. The fourth Timeline band 1634 can also include a window 1640, such as a preview window with a photo, name, and message for a short message service (SMS) contact.

For illustrative purposes, four bands are shown, such as email, SMS, calls and opened Apps, although it is understood that any number of type of bands may be displayed. The bands can connect to main buttons of a home screen or panel of a device, such as a phone, to indicate presence of a Timeline. The main buttons open the respective application for email, SMS, dialer, App launcher, or combination thereof.

It has been discovered that the electronic system 100 with the first Timeline band 1604, the second Timeline band 1614, the third Timeline band 1624, the fourth Timeline band 1634, or combination thereof, provides the Timeline feature or mode integrated as an operating system feature that increases productivity and usability. The Timeline feature or mode can record important events on the mobile phone and display links to the events in chronological order.

It has further been discovered that the electronic system 100 with the first Timeline band 1604, the second Timeline band 1614, the third Timeline band 1624, the fourth Timeline band 1634, or combination thereof, provides the Timeline feature or mode for convenient access to tasks previously left undone, convenient follow up for important system notifications, easy access to actions which are executed frequently, or combination thereof.

It has yet further been discovered that the electronic system 100 with the first Timeline band 1604, the second Timeline band 1614, the third Timeline band 1624, the fourth Timeline band 1634, or combination thereof, provides the Timeline feature or mode with an overview of recent system usage. Thus allowing a user to remember and organize accordingly.

Figure 17:
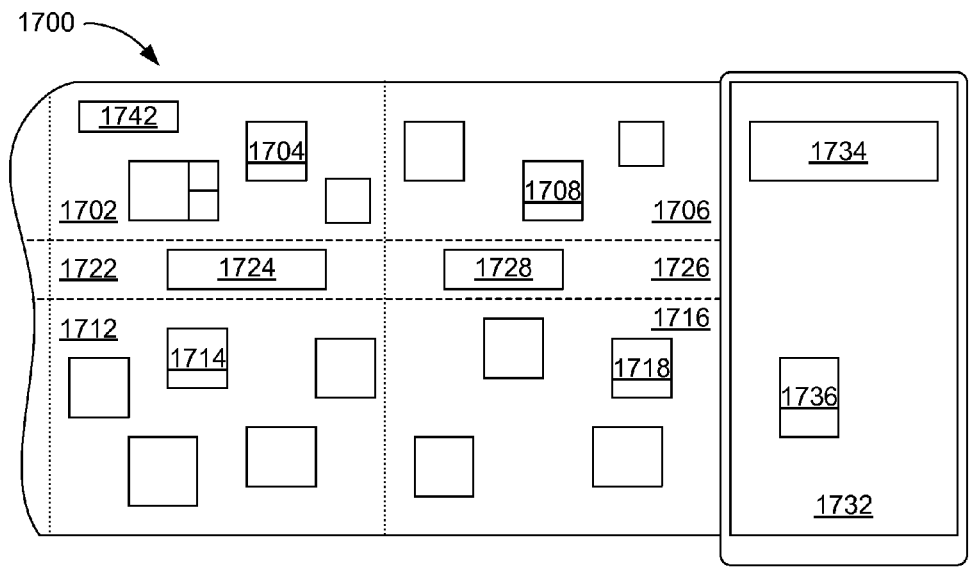
FIG. 17 is a plan view of the electronic system in an exemplary embodiment.

Referring now to FIG. 17, therein is shown a plan view 1700 of the electronic system 100 in an ex exemplary embodiment. The electronic system 100 can include an unlocked portrait mode. The unlocked portrait mode can provide clustering, accumulating, grouping, arranging, displaying, or combination thereof, for links to events based on the Timeline feature or mode with chronological order.

In this embodiment, events are more loosely clustered or accumulated. A band can display communication events in a functional way. Another band can be more entertainment oriented and may not display every event while grouping them into relevant clusters. Yet another band can display calendar events, "check-ins" and other events with knowledge of time and location of a user. Thus a user can set entertainment clusters with relation to time.

Reversible operating system (OS) events can be shown on top of a Timeline band. Tapping the reversible operating system (OS) events allows a user to revert the events. Current events, unread notifications, and warnings about future events can be displayed on a home screen or panel. These home screen notifications can move to a Timeline panel if a user dismisses the notifications or the notification become historical events.

A first day first Timeline band 1702, such as a communications band for "yesterday", can include first day first band icons 1704, such as links with a photos and names for contact events. Tapping on the first day first band icons 1704 can open the communications or conversation. Similarly, a second day first Timeline band 1706, such as a communications band for "today" can include second day first band icons 1708, such as links with a photos and names for contact events. Tapping on the second day first band icons 1708 can open the communications or conversation.

A first day second Timeline band 1712, such as a content, entertainment, or applications band for "yesterday", can include first day second band icons 1714, such as links for events, applications, music, games, websites, or combination thereof. Tapping on the first day second band icons 1714 can open or launch the events, applications, music, games, websites, or combination thereof. Similarly, a second day second Timeline band 1716, such as a content, entertainment, or applications band for "today" can include second day second band icons 1718, such as links for events, applications, music, games, websites, or combination thereof. Tapping on the second day second band icons 1718 can open or launch the events, applications, music, games, websites, or combination thereof.

A first day third Timeline band 1722, such as calendar, user insight, band for "yesterday", can include first day third band icons 1724, such as links for calendar events, "check-ins", other occasions with time and location, or combination thereof. Tapping on the first day third band icons 1724 can open the calendar events, "check-ins", other occasions with time and location, or combination thereof. A second day third Timeline band 1726, such as calendar, user insight, band for "yesterday", can include second day third band icons 1728, such as links for calendar events, "check-ins", other occasions with time and location, or combination thereof. Tapping on the second day third band icons 1728 can open the calendar events, "check-ins", other occasions with time and location, or combination thereof.

A notification area (NOW) 1732 can include a notification window 1734 such as a conversation. Tapping an unread communication can open the notification window 1734, mark the communication as read, and moving a link to the communication into the first day first Timeline band 1702, the second day first Timeline band 1706, the first day second Timeline band 1712, the second day second Timeline band 1716, the first day third Timeline band 1722, the second day third Timeline band 1726, or combination thereof.

It has been discovered that the electronic system 100 with Timeline bands, such as the first day first Timeline band 1702, the second day first Timeline band 1706, the first day second Timeline band 1712, the second day second Timeline band 1716, the first day third Timeline band 1722, the second day third Timeline band 1726, or combination thereof, eases a user's daily use flow by assisting with ongoing conversations, recently consumed content, continuing intermittent tasks.

Figure 18:
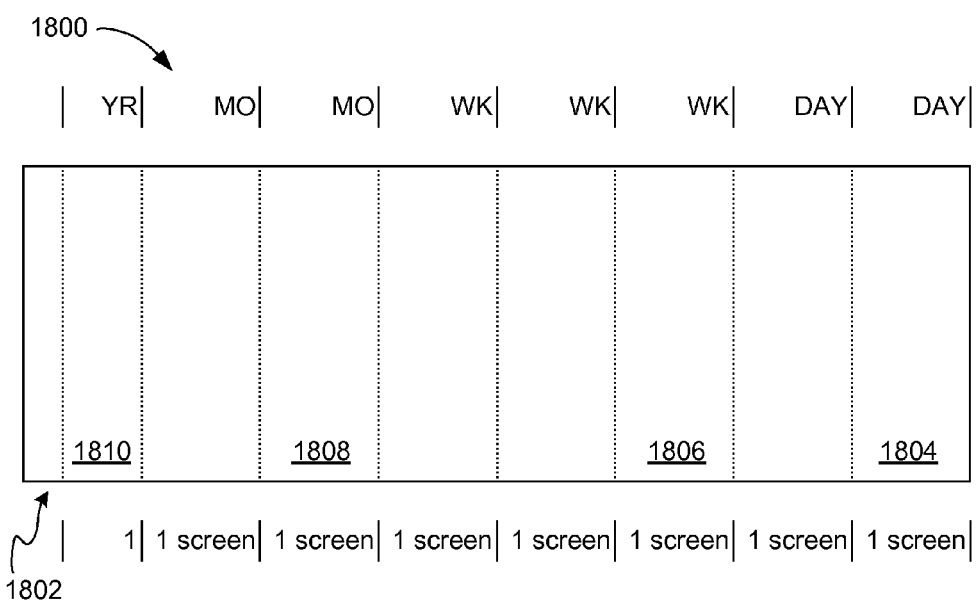
FIG. 18 is a plan view of the electronic system in an exemplary embodiment.

Referring now to FIG. 18, therein is shown a plan view 1800 of the electronic system 100 in an ex exemplary embodiment. The electronic system 100 can optionally aggregate events in a Timeline mode or screen display towards past dates to compact or make the Timeline mode or screen display more dense.

Events further in the past can be shown in a denser timeline to increase the amount of days that can be displayed. Some timelines can only display three to seven days. Density can be determined by statistical data for a compressed period. For example, tapping one condensed period can open and unfold the one condensed period to an uncondensed view.

A compressed Timeline mode 1802 can include a recent date screen mode 1804. The recent date screen mode 1804 can occupy a screen area equivalent to a past week screen mode 1806 although the past week screen mode 1806 spans up to seven times the time span of the recent date screen mode 1804.

Further aggregation or compression can be provided in a compressed month mode 1808. The compressed month mode 1808 can occupy a screen area equivalent to the recent date screen mode 1804 although the compressed month mode 1808 spans up to thirty one times the time span of the recent date screen mode 1804, or up to four times the time span of the past week screen mode 1806.

It has been discovered that the electronic system with the compressed Timeline mode 1802 can provide a timeline with significantly higher density to increase the amount of time that can be displayed. The compressed Timeline mode 1802 can provide users additional visibility and flexibility with chronological events, such as calendar events, "check-ins", notification, user interaction, communication events, entertainment events, discovery events, or combination thereof, particularly for events in the past.

Figure 19:
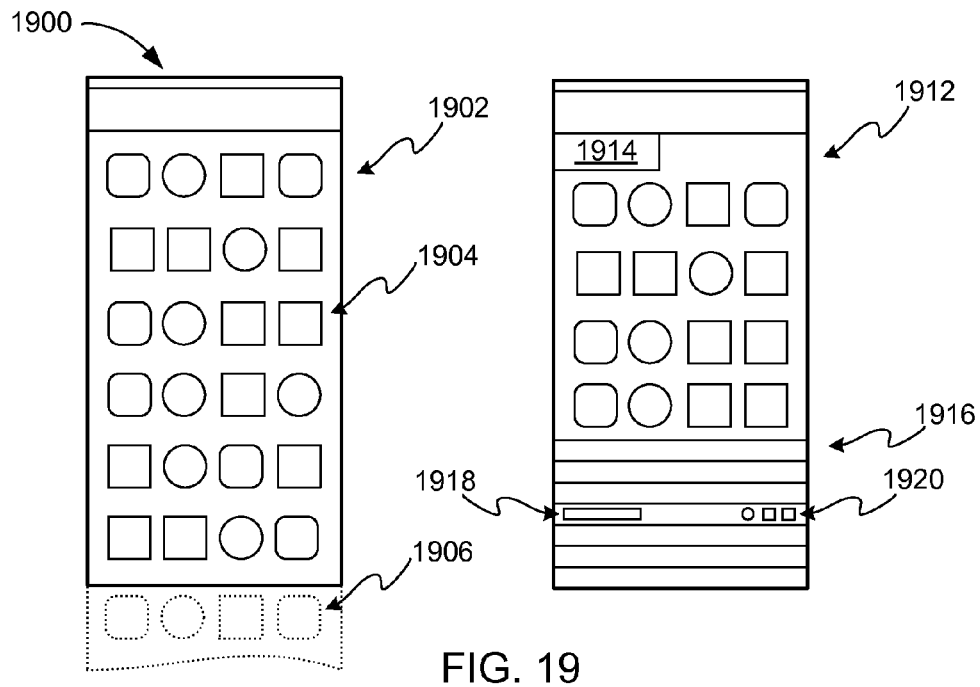
FIG. 19 is a plan view of the electronic system in an exemplary embodiment.

Referring now to FIG. 19, therein is shown a plan view 1900 of the electronic system 100 in an exemplary embodiment. The electronic system 100 can include application drawers for automatically organizing links to device applications (apps), such as icons, symbols, images, or combination thereof, and for a visual display or a user interface based on categories. The categories can be assigned by a third party or a user. The application drawers can be implemented on a display such as the first display interface 230 of FIG. 2, the second display interface 240 of FIG. 2, the display interface 302 of FIG. 3, or combination thereof.

The user can also override or edit category names of the application drawers or may move applications (apps) between drawers. As an example, if a user overrides a definition of an application drawer, links to new applications (apps) intended for the previous category can be placed in an undefined drawer category such as "Other".

In an example with a device or an application store, categories that the store uses to organize discovery of applications (apps) can optionally be modified by combining, dividing, renaming, or combination thereof. A visual metaphor can be created with a set of application drawers having one application drawer for each new resulting category.

Further for example with some applications being downloaded from an application store to a device, each application's (app's) category can be detected based on a label in the application store, and the app can be placed in a corresponding drawer, such as an appropriate metaphorical drawer, within the device's user interface.

A variety of heuristics can be applied to recommend new applications (apps) to a user, such as by placing visual representations of the recommended apps in appropriate drawers. Further, new application drawers can be created and applications (apps) may be placed into or removed from application drawers based on contextual factors such as frequency used, time of day typically used, travel outside a home area, interests as indicated by a user, interests as automatically generated by a service, recommendations automatically generated by a service, recommendations suggested by friends, or combination thereof. Similarly, custom home screen panes can be generated from these factors, other factors, or combination thereof The electronic system 100 can include a first application drawer mode 1902. For example, the first application drawer may not be labeled and include application icons 1904, such as a list of pinned or favorite applications (apps). The list of pinned or favorite applications can be long. Additional icons 1906 can scroll beyond the display. Access to the first drawer can be opened by default or require selection.

A second application drawer mode 1912 can include an application drawer label 1914. The application drawer label 1914, such as an application drawer category, can be based on an application store's category or a user category. The second application drawer mode 1912 can also include additional application drawers 1916, such as categories that can include favorites, communication, photography, games, music, work, travel, finance, any other categories, or combination thereof.

The additional application drawers 1916 can include an additional drawer label 1918 and additional application icons 1920. The additional drawer label 1918 and the additional application icons can be smaller in size than the application drawer label 1914 and the application icons 1904, respectively. The additional drawer label 1918 and the additional application icons can be implemented as a mini view of the applications in a category view.

For illustrative purposes, seven categories are shown at a bottom of the second application drawer mode 1912 although it is understood that any number, location, or configuration may be implemented.

It has been discovered that the electronic system with the first application drawer mode 1902 and the second application drawer mode 1912 can organize application links based on predetermined categories arranged in application drawers. The application drawers can provide discovery of applications, recommendations for applications, recall of applications, or combination thereof.

Figure 20:
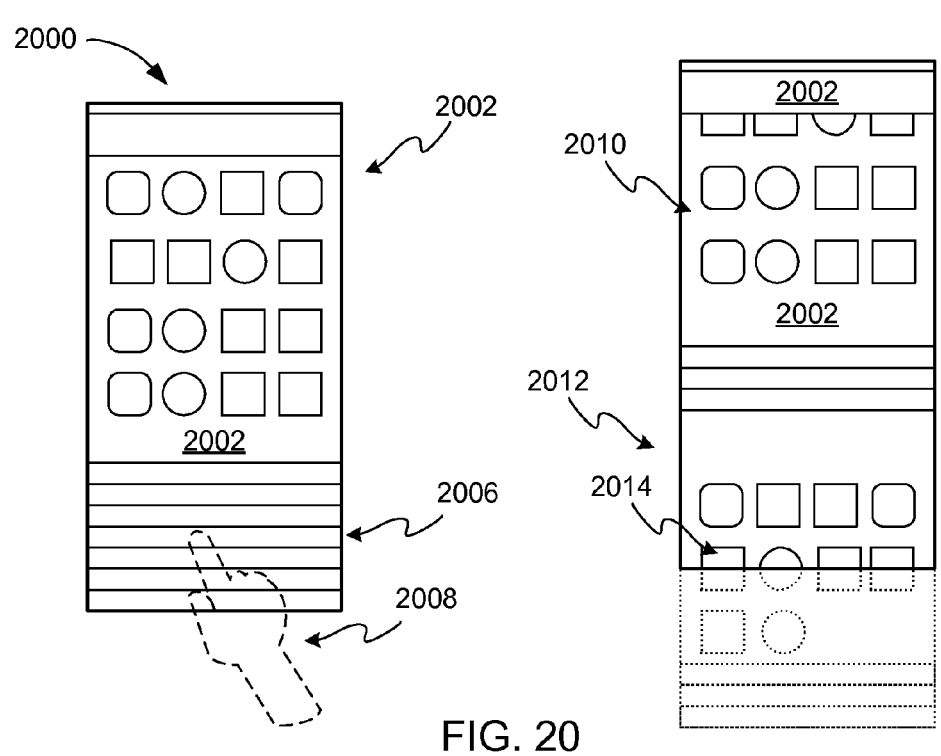
FIG. 20 is a plan view of the electronic system in an exemplary embodiment.

Referring now to FIG. 20, therein is shown a plan view 2000 of the electronic system 100 in an exemplary embodiment. The electronic system 100 can provide selection and scrolling of application drawers. A first application drawer mode 2002 can include an application drawer 2006. The application drawer 2006, such as a category based on an application store's category or a user category, can be selected to switch from a displayed application drawer or category to the application drawer 2006.

Selecting the application drawer 2006 with a selection motion 2008 can automatically scroll the display to a top of the selected application drawer view. A previously opened drawer 2010 can close or scroll at least partially out of view. Selection of the application drawer 2006 can scroll at least partially or display a second application drawer mode 2012. The second application drawer mode 2012 can display application icons 2014 associated with the application drawer 2006.

It has been discovered that selecting the application drawer 2006 in the first application drawer mode 2002 can display the application icons 2014 associated with the application drawer 2006 and optionally display the previously opened drawer 2010. Displaying both drawers can provide additional flexibility and smooth transition.

Figure 21:
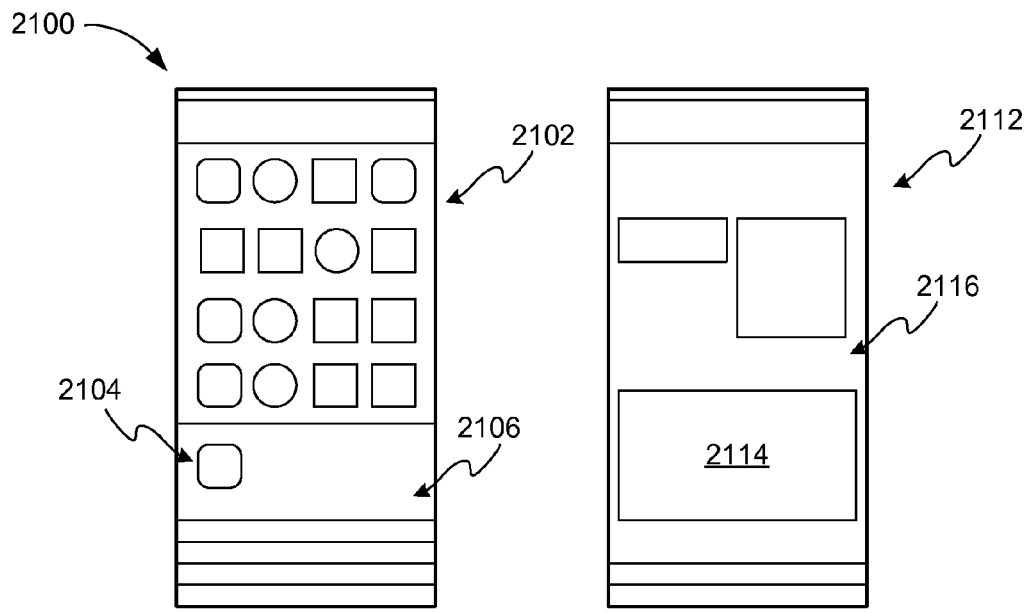
FIG. 21 is a plan view of the electronic system in an exemplary embodiment.

Referring now to FIG. 21, therein is shown a plan view 2100 of the electronic system 100 in an exemplary embodiment. The electronic system 100 can include a first application drawer mode 2102.

In a manner similar to the description for recommendations of FIG. 19, the first application drawer mode 2102 can include a recommended icon 2104 for a recommended application (app). The first application drawer mode 2102 can include a recommended section 2106 to distinguish the recommended icon 2104.

Similarly, a second application drawer mode 2112 can include items 2114, such as widgets, in an item section 2116. The second application drawer mode 2112 can hold different types of the items 2114, such as widgets. The items 2114 can be displayed with different modular grids and any of the items 2114 can span two or multiple columns or rows of the modular grids.

It has been discovered that the electronic system 100 with the recommended section 2106 and the item section 2116 can provide other different items in addition to or replacing the application icons, such as the application icons 1904 of FIG. 19 or the application icons 2014 of FIG. 20.

Figure 22:
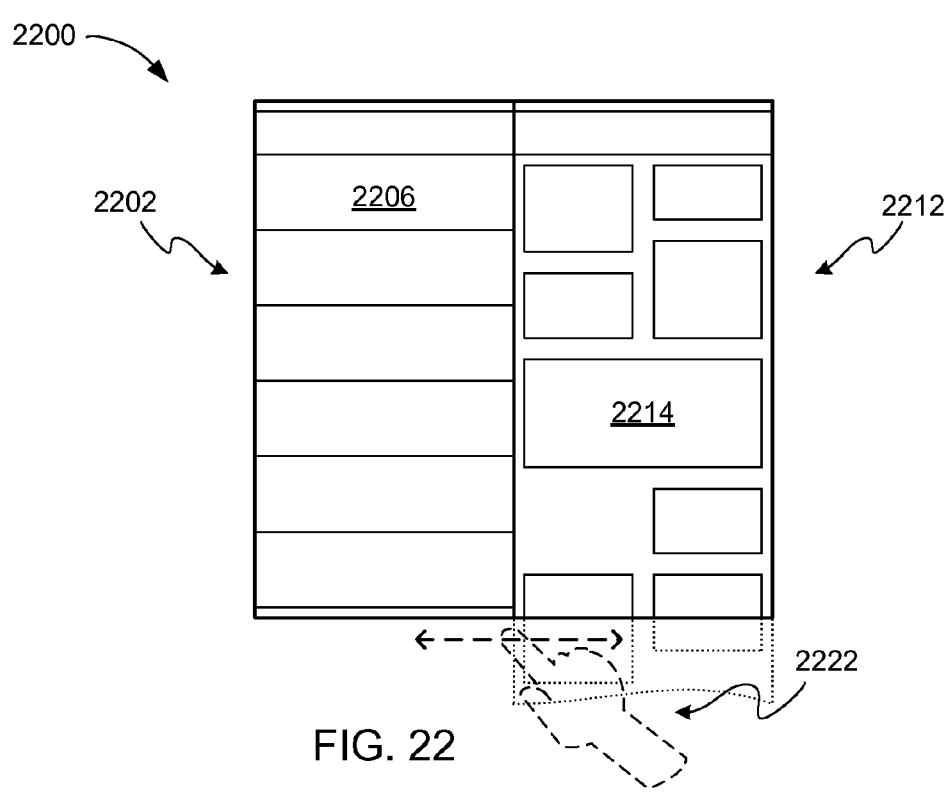
FIG. 22 is a plan view of the electronic system in an exemplary embodiment.

Referring now to FIG. 22, therein is shown a plan view 2200 of the electronic system 100 in an exemplary embodiment. The electronic system 100 can include a first application drawer mode 2202. The first application drawer mode 2202 can include application drawers 2206, such as categories for communication, photography, games, music, work, travel, or finance.

A second portrait display mode 2212, such as a widget repository, can include items 2214, such as widgets. For illustrative purposed, the second portrait display mode 2212 is shown with the items 2214, such as widgets, although it is understood that the second portrait display mode 2212 can include any content.

A screen motion 2222, such as a finger or stylus swipe, can switch the first application drawer mode 2202 to the second portrait display mode 2212 or the second portrait display mode 2212 to the first application drawer mode 2202. For illustrative purposed, the screen motion 2222 is shown as a finger swipe although it is understood that the screen motion 2222 may be any screen motion or implement by any means.

It has been discovered that the electronic system 100 with the screen motion 2222 can switch display modes such as the first application drawer mode 2202 to the second portrait display mode 2212. The screen motion 2222 can provide a simple and efficient means for switching modes.

Figure 23:
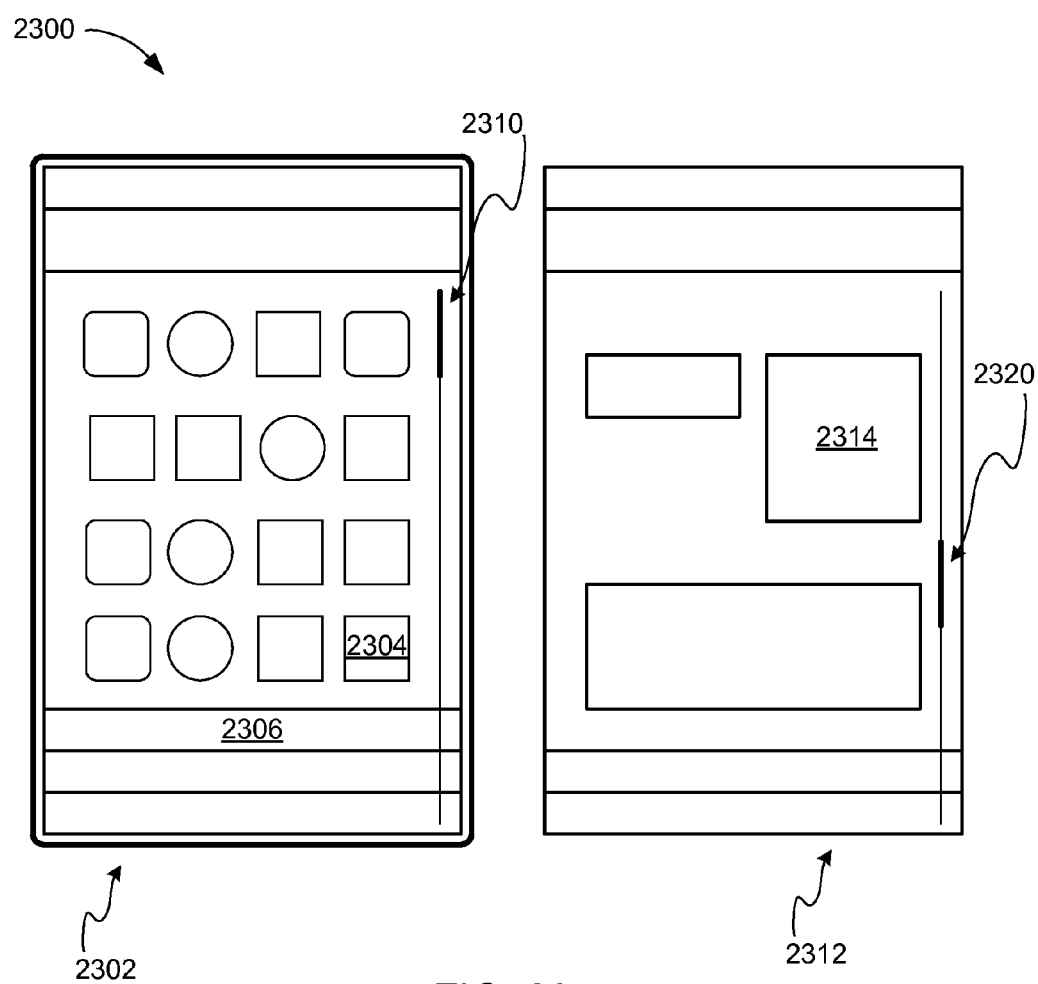
FIG. 23 is a plan view of the electronic system in an exemplary embodiment.

Referring now to FIG. 23, therein is shown a plan view 2200 of the electronic system 100 in an exemplary embodiment. The electronic system 100 can provide multiple distinct modes on a same display, such as the first display interface 230 of FIG. 2, the second display interface 240 of FIG. 2, the display interface 302 of FIG. 3, or combination thereof.

A first portrait display mode 2302, such as an applications (apps) drawer, can include application icons 2304, application drawers 2306, other items, or combination thereof. A first display slide 2310 can control or indicate a display screen position, such as by vertical movement or scrolling. The first display slide 2310 is shown in a top vertical position indicating a position of the first portrait display mode 2302.

A second portrait display mode 2312, such as a widget library, can include items 2314, such as widgets. A second display slide 2320 can control or indicate a display screen position, such as by vertical movement or scrolling. The second display slide 2320 is shown in an intermediate vertical position indicating a display screen position of the second portrait display mode 2312.

It has been discovered that the electronic system 100 with the display slides 2310, 2320 can provide multiple display screen modes, such as the first portrait display mode 2302 and the second portrait display mode 2312, based on movement or position of the display slides 2310, 2320. Scrolling multiple display screen modes improves productivity through a simple and intuitive mechanism.

Figure 24:
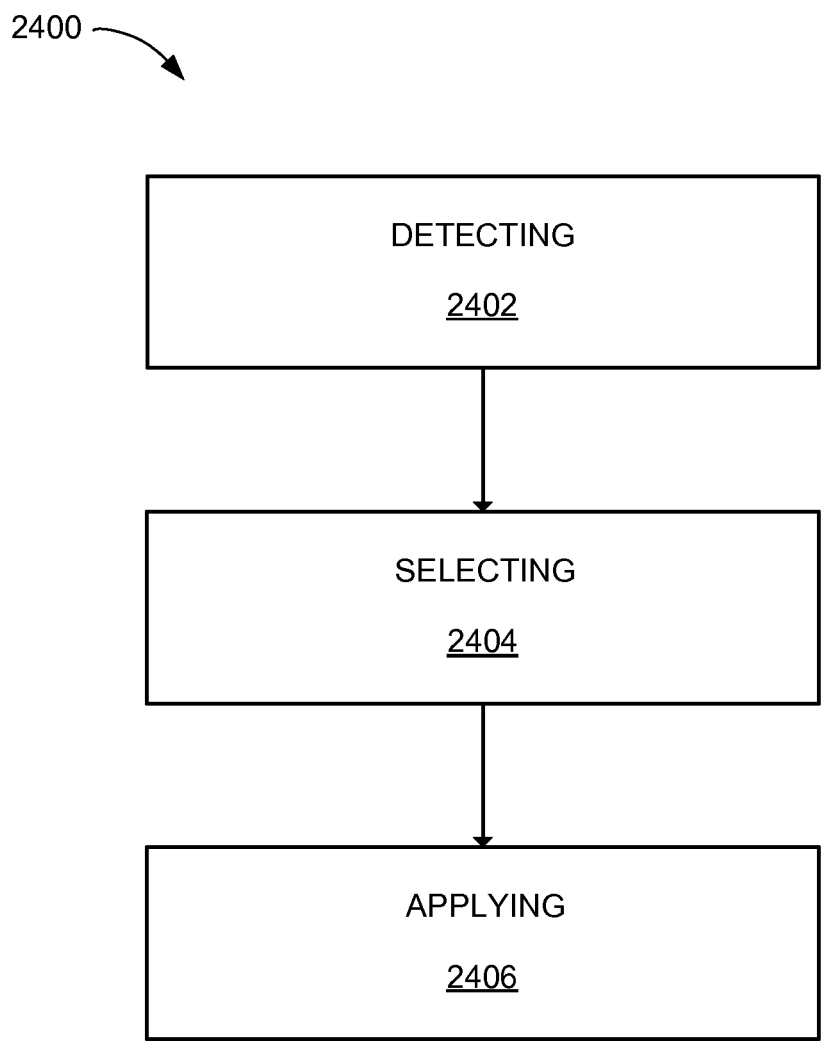
FIG. 24 is a flow chart of a method of operation of an electronic system in an embodiment of the present invention.

Referring now to FIG. 24, therein is shown a flow chart of a method 2400 of operation of an electronic system 100 in an embodiment of the present invention. The method 2400 includes: detecting, with a control unit, a motion applied to a device with a display in a mode in a block 2402; selecting another mode of the display based on the device motion in a block 2504; and applying a screen motion to the another mode of the display in a block 2506.

detecting a motion applied to a device with a display in a mode; selecting another mode of the display based on the device motion; and applying a screen motion to the another mode of the display.

The electronic system 100 can provide an enhanced and a pleasurable user experience by utilizing sensors such as gyroscopic sensor within mobile devices. By physically rotating a device between various orientations of the device, such as landscape, portrait, front, back, 180 degrees, top vs bottom, or combination thereof, the user can quickly switch between different tasks, functions, or use modalities.

The electronic system 100 can provide best possible use cases in a given orientation. For example a horizontal mode can be optimized for consuming media, reading, watching movies, similar tasks, or combination thereof. A vertical mode can be optimized for viewing lists, navigation menus, carrying out specific, productivity tasks, or combination thereof. The landscape mode can also draw ties to proprietary core products, such as Samsung televisions, often used for watching movies or other forms of entertainment which can be consumed in a landscape orientation.

The electronic system 100 rotating the lock landscape mode 602, the unlocked portrait mode 638, the lock screen portrait mode 606, the unlocked landscape mode 630, or combination thereof, takes advantage of an opportunity for improved user experience on mobile devices utilizing both physical and/or gestural interaction as well as touch display interaction. This innovation utilizes the capabilities of mobile devices to detect physical orientation of and rotation of the device in order to deliver an enhanced user experience.

The electronic system can utilize physical rotation and change of orientation of a device at a core operating system (OS) level to seamlessly move between two different use modes or tasks. This can be implemented at the lock screen level, home screen or panel level, as well as any other location in the OS architecture.

The electronic system 100 with the directional unlock 704 and rotation of the first device 102 of FIG. 1, can take advantage of the ability on mobile device to sense rotation and orientation of the device in order to deliver unique and valuable user experiences optimized for a variety of different modalities as use cases. The different modes or content in lock screen modes or unlocked home layer screen or panel modes based on specific motion patterns provides significantly increased functions.

The electronic system 100 can include two or more distinct operating modes for the device; one or more modes is active when the device is in vertical or portrait orientation, and the other one or more modes is active in horizontal or landscape orientation. Rotating the first display interface 230 of FIG. 2, the second display interface 240 of FIG. 2, the display interface 302 of FIG. 3, or combination thereof, of the first device 102 from vertical to horizontal or horizontal to vertical results in switching the display of the first device 102 from one mode to another.

The electronic system with the screen motion 922 can provide an orientation change with a physical gesture such as a swipe or a tap on a screen or a case. The physical gesture including the swipe on the screen or the tap on the case can result in switching form one mode to another mode.

The electronic system 100 with switching from one mode to another mode can also provide interaction between the modes such as moving, copying, accessing, launching, locking, unlocking, mode switching, scrolling, closing, selecting, confirming, denying, any command, any operation, any function, or combination thereof.

The electronic system 100 with the case motion 1104, the first screen motion 1114, the second screen motion 1124, and the switcher mode 1102, can provide an easily accessible environment with applications and modes for younger users such as the "Kid's Mode".

The electronic system 100 with "Kid's Mode" can maintain a viewing position of the image 1204 while rotated to switch the display from the portrait mode 1202 to the landscape mode 1222, or to switch from the landscape mode 1222 to the portrait mode 1202.

The electronic system 100 can switch between modes or content layers of the display with the first physical motion 1316 or the second physical motion 1336. For example, one-hundred eighty degree rotation or front to back flip can each provide simple but distinct switching between modes or content layers.

The electronic system 100 with the first physical motion 1316 or the second physical motion 1336 can implement successive motions for additional simple but distinct switching between yet more modes or content layers.

The device 1402 with the first display side 1404 and the second display side 1406 can provide a unique experience with two display screens with existing operating systems. The two display screens on opposite sides can provide additional always on functions.

The electronic system with the physical motion 1504 to switch between modes can provide an in-between or intermediate mode with multiple quick modes. The multiple quick modes can be similar to the initial modes or may be different, to provide additional modes and functions.

The electronic system 100 with the first Timeline band 1604, the second Timeline band 1614, the third Timeline band 1624, the fourth Timeline band 1634, or combination thereof, provides the Timeline feature or mode integrated as an operating system feature that increases productivity and usability. The Timeline feature or mode can record important events on the mobile phone and display links to the events in chronological order.

The electronic system 100 with the first Timeline band 1604, the second Timeline band 1614, the third Timeline band 1624, the fourth Timeline band 1634, or combination thereof, provides the Timeline feature or mode for convenient access to tasks previously left undone, convenient follow up for important system notifications, easy access to actions which are executed frequently, or combination thereof.

The electronic system 100 with the first Timeline band 1604, the second Timeline band 1614, the third Timeline band 1624, the fourth Timeline band 1634, or combination thereof, provides the Timeline feature or mode with an overview of recent system usage. Thus allowing a user to remember and organize accordingly.

The electronic system 100 with Timeline bands, such as the first day first Timeline band 1702, the second day first Timeline band 1706, the first day second Timeline band 1712, the second day second Timeline band 1716, the first day third Timeline band 1722, the second day third Timeline band 1726, or combination thereof, eases a user's daily use flow by assisting with ongoing conversations, recently consumed content, continuing intermittent tasks.

The electronic system with the compressed Timeline mode 1802 can provide a timeline with significantly higher density to increase the amount of time that can be displayed. The compressed Timeline mode 1802 can provide users additional visibility and flexibility with chronological events, such as calendar events, "check-ins", notification, user interaction, communication events, entertainment events, discovery events, or combination thereof, particularly for events in the past.

The electronic system with the first application drawer mode 1902 and the second application drawer mode 1912 can organize application links based on predetermined categories arranged in application drawers. The application drawers can provide discovery of applications, recommendations for applications, recall of applications, or combination thereof.

Selecting the application drawer 2006 in the first application drawer mode 2002 can display the application icons 2014 associated with the application drawer 2006 and optionally display the previously opened drawer 2010. Displaying both drawers can provide additional flexibility and smooth transition.

The electronic system 100 with the recommended section 2106 and the item section 2116 can provide other different items in addition to or replacing the application icons, such as the application icons 1904 of FIG. 19 or the application icons 2014 of FIG. 20.

The electronic system 100 with the screen motion 2222 can switch display modes such as the first application drawer mode 2202 to the second portrait display mode 2212. The screen motion 2222 can provide a simple and efficient means for switching modes.

The electronic system 100 with the display slides 2310, 2320 can provide multiple display screen modes, such as the first portrait display mode 2302 and the second portrait display mode 2312, based on movement or position of the display slides 2310, 2320. Scrolling multiple display screen modes improves productivity through a simple and intuitive mechanism.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic device comprising:
  a control unit configured to:
    detect a motion to rotate the electronic device in a mode;
    select another mode based on the motion;
    switch between multiple instances of a content layer based on the motion wherein one instance of the content layer corresponds to an opposite side of another instance of the content layer for displaying each instance of the content layer on each screen of the electronic device facing away from one another; and
  a user interface, coupled to the control unit, configured to display the multiple instances of the content layer according to transition between the mode and the another mode.

2. The device as claimed in claim 1 wherein the control unit is configured to detect the motion to rotate an orientation of the electronic device between a designated front and back.

3. The device as claimed in claim 1 wherein the control unit is configured to:
  detect a screen motion on the electronic device in the mode; and
  transition to the another mode based on the screen motion.

4. The device as claimed in claim 1 wherein the control unit is configured to select the another mode including a kid's mode for providing an interactive play space.

5. The device as claimed in claim 1 wherein the control unit is configured to select the another mode including a Timeline mode for providing a visibility of a chronological event.

6. The device as claimed in claim 1 wherein the control unit is configured to select the another mode including an application drawer mode for automatically organizing links to an icon, a symbol, an image, or a combination thereof.

7. The device as claimed in claim 1 wherein the control unit is configured to:
- detect a magnitude and a direction of the motion; and
- select an intermediate mode for rotating an image, a text, a symbol, or a combination thereof based on the magnitude opposite the direction on the electronic device.

8. A method of operation of an electronic system comprising:
- detecting, with a control unit, a motion to rotate a device in a mode;
- selecting another mode based on the motion;
- switching between multiple instances of a content layer based on the motion wherein each of the content layer is provided on an opposite side of one another for displaying each instance of the content layer on each screen of an electronic device facing away from one another; and
- displaying the multiple instances of the content layer according to transition between the mode and the another mode.

9. The method as claimed in claim 8 wherein detecting the motion includes detecting a change in an orientation of the device between a designated front and back.

10. The method as claimed in claim 8 further comprising:
- detecting a screen motion on the device in the mode; and
- transitioning to the another mode based on the screen motion.

11. The method as claimed in claim 8 wherein selecting the another mode includes selecting a kid's mode for providing an interactive play space.

12. The method as claimed in claim 8 wherein selecting the another mode includes selecting a Timeline mode for providing a visibility of a chronological event.

13. The method as claimed in claim 8 wherein selecting the another mode includes selecting an application drawer mode for automatically organizing links to an icon, a symbol, an image, or a combination thereof.

14. The method as claimed in claim 8 wherein:
- detecting the motion includes detecting a magnitude and a direction of the motion; and
- selecting an intermediate mode for rotating an image, a text, a symbol, or a combination thereof based on the magnitude opposite the direction on the device.

15. A non-transitory computer readable medium including stored thereon instructions to be executed by a control unit comprising:
- detecting a device motion to rotate a device in a mode;
- selecting another mode based on the motion;
- switching between multiple instances of a content layer based on the motion wherein each of the content layer is provided on an opposite side of one another for displaying each instance of the content layer on each screen of an electronic device facing away from one another; and
- displaying the multiple instances of a content layer according to transition between the mode and the another mode.

16. The medium as claimed in claim 15 wherein detecting the motion includes detecting a change in an orientation of the device between a designated front and back.

17. The medium as claimed in claim 15 further comprising:
- detecting a screen motion on the device in the mode; and
- transitioning to the another mode based on the screen motion.

18. The medium as claimed in claim 15 wherein selecting the another mode includes selecting a kid's mode for providing an interactive play space.

19. The medium as claimed in claim 15 wherein selecting the another mode includes selecting a Timeline mode for providing a visibility of a chronological event.

20. The medium as claimed in claim 15 wherein selecting the another mode includes selecting an application drawer mode for automatically organizing links to an icon, a symbol, an image, or a combination thereof.

* * * * *